(12) United States Patent
Huza et al.

(10) Patent No.: US 11,692,922 B2
(45) Date of Patent: Jul. 4, 2023

(54) FILTER TESTING APPARATUS AND METHOD

(71) Applicant: American Air Filter Company, Inc., Louisville, KY (US)

(72) Inventors: Mark Huza, Greenville, NC (US); Gene Lupton, Grifton, NC (US); Satish Dinakaran, New Albany, IN (US); Kenneth Beacham, Washington, NC (US); Joshua Ray Selby, Washington, NC (US); Jeremiah Scott Foreman, Washington, NC (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 0 days.

(21) Appl. No.: 17/532,146

(22) Filed: Nov. 22, 2021

(65) Prior Publication Data

US 2022/0074842 A1    Mar. 10, 2022

Related U.S. Application Data

(62) Division of application No. 16/562,960, filed on Sep. 6, 2019, now Pat. No. 11,181,461.

(60) Provisional application No. 62/728,544, filed on Sep. 7, 2018.

(51) Int. Cl.
*G01N 15/08* (2006.01)
*H02K 41/02* (2006.01)
*H02K 41/03* (2006.01)

(52) U.S. Cl.
CPC ..... *G01N 15/0826* (2013.01); *B01D 2273/18* (2013.01); *G01N 2015/084* (2013.01); *H02K 41/02* (2013.01); *H02K 41/03* (2013.01)

(58) Field of Classification Search
CPC ............ B01D 2273/18; B01D 46/0086; B01D 46/442; G01N 2015/084; G01N 2001/2223
See application file for complete search history.

(56) References Cited

U.S. PATENT DOCUMENTS

| | | |
|---|---|---|
| 2,898,485 A | 8/1959 | Albert et al. |
| 3,707,869 A | 1/1973 | Raynor |
| 3,765,225 A | 10/1973 | Rivers |
| 4,055,075 A | 10/1977 | Allan et al. |
| 4,184,090 A | 1/1980 | Taiani et al. |
| 4,277,707 A | 7/1981 | Silver et al. |
| 4,324,568 A | 4/1982 | Wilcox et al. |
| 4,494,403 A | 1/1985 | Bowers et al. |

(Continued)

FOREIGN PATENT DOCUMENTS

| | | |
|---|---|---|
| CN | 103962361 A | 8/2014 |
| CN | 105135530 A | 12/2015 |

(Continued)

OTHER PUBLICATIONS

US 9,366,411 B2, 06/2016, Hino (withdrawn)

(Continued)

*Primary Examiner* — David A. Rogers
(74) *Attorney, Agent, or Firm* — Gray Ice Higdon

(57) ABSTRACT

A method and apparatus for filter testing for use within an air handling system. The air handling system may include one or more scan assemblies. The scan assembly may include a track system using one or more magnetic arrays.

19 Claims, 17 Drawing Sheets

(56) References Cited

U.S. PATENT DOCUMENTS

Figure 1:
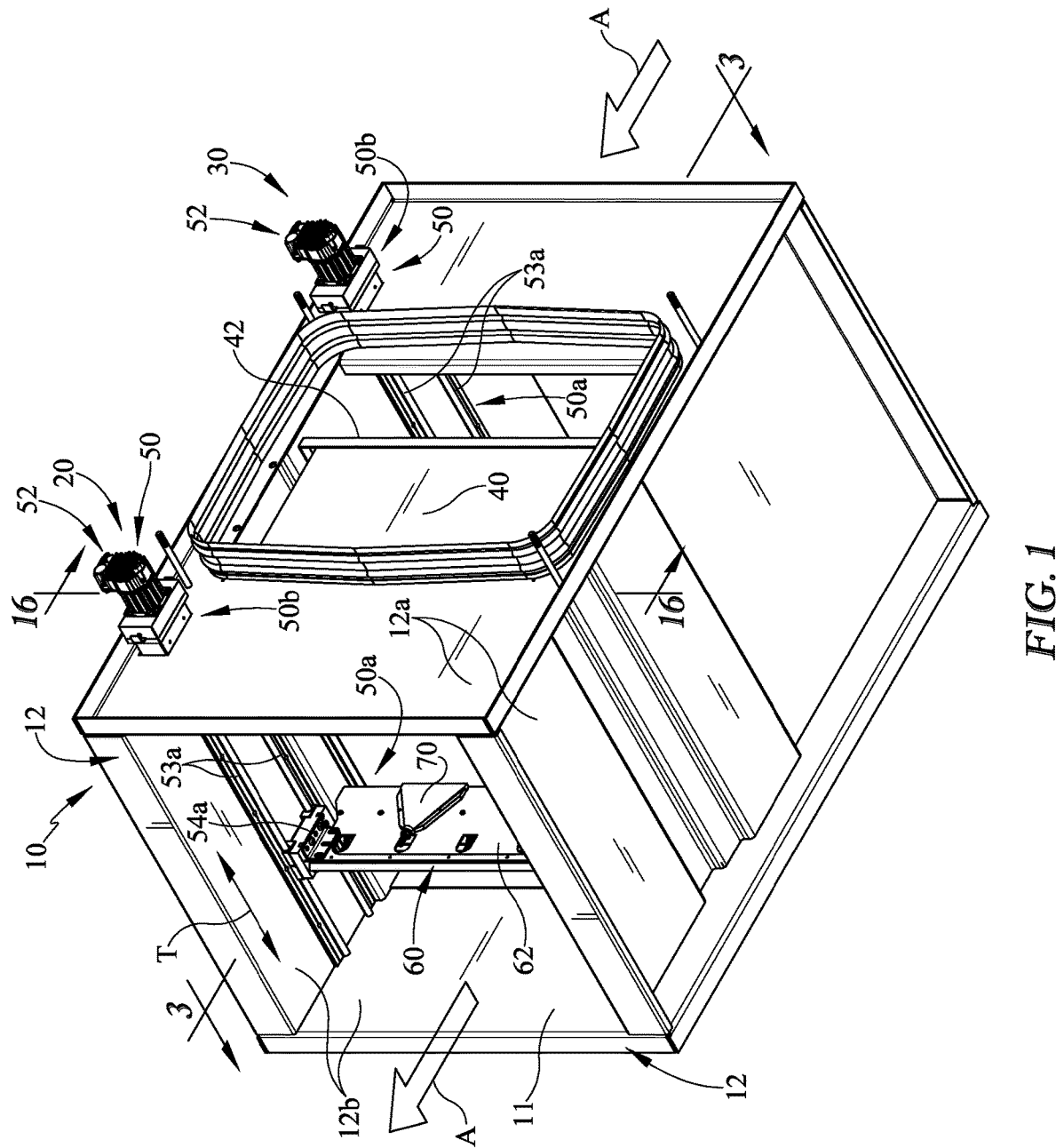

| | | |
|---|---|---|
| 4,515,007 A | 5/1985 | Herman |
| RE31,952 E | 7/1985 | Wilcox et al. |
| 4,548,536 A | 10/1985 | Bhiga et al. |
| 4,641,065 A | 2/1987 | Shibuki et al. |
| 4,850,779 A | 7/1989 | Cashell et al. |
| 4,893,980 A | 1/1990 | Balter |
| 4,901,578 A | 2/1990 | Brill, III |
| 5,105,932 A | 4/1992 | Bryson, III et al. |
| 5,224,585 A | 7/1993 | Blanco et al. |
| 5,388,086 A | 2/1995 | Yamasaki et al. |
| 5,415,483 A | 5/1995 | Franklin, Jr. |
| 5,514,925 A | 5/1996 | Worthington et al. |
| 5,955,798 A | 9/1999 | Ishiyama et al. |
| 5,980,193 A | 11/1999 | Clifton et al. |
| 6,308,818 B1 | 10/2001 | Bonora et al. |
| 6,679,671 B2 | 1/2004 | Blonigan et al. |
| 6,712,907 B1 | 3/2004 | Pratt et al. |
| 7,010,960 B1 | 3/2006 | Grantham |
| 7,028,831 B2 | 4/2006 | Veiner |
| 7,057,369 B2 | 6/2006 | Hoffman |
| 7,439,735 B2 | 10/2008 | Barnabo et al. |
| 7,658,787 B2 | 2/2010 | Morse et al. |
| 7,669,490 B2 | 3/2010 | Yoshitome |
| 7,758,664 B2 | 7/2010 | Morse et al. |
| 7,882,727 B2 | 2/2011 | Morse et al. |
| 7,896,938 B2 | 3/2011 | Morse et al. |
| 7,997,300 B1 * | 8/2011 | Wise .............. G01N 1/2202 |
| | | 73/863 |
| 7,998,252 B2 | 8/2011 | Huza et al. |
| 8,048,182 B2 | 11/2011 | Morse et al. |
| 8,133,310 B2 | 3/2012 | Huza et al. |
| 8,202,337 B2 | 6/2012 | Morse et al. |
| 8,210,056 B2 | 7/2012 | Pike et al. |
| 8,329,801 B2 | 12/2012 | Morse et al. |
| 8,408,046 B2 | 4/2013 | Xu et al. |
| 8,549,895 B2 | 10/2013 | Chung et al. |
| 8,608,825 B2 | 12/2013 | Morse et al. |
| 8,999,035 B2 | 4/2015 | Morse et al. |
| 9,062,694 B2 | 6/2015 | Fletcher et al. |
| 9,234,812 B2 | 1/2016 | Krywy |
| 9,266,068 B2 | 2/2016 | Bryan et al. |
| 9,360,411 B2 | 6/2016 | Woodlard et al. |
| 9,772,271 B2 | 9/2017 | Peacock et al. |
| 9,821,911 B2 | 11/2017 | Wallbott et al. |
| 9,999,908 B2 | 6/2018 | Dobbyn |
| 10,006,848 B2 | 6/2018 | Woolard et al. |
| 10,180,384 B2 | 1/2019 | Verma et al. |
| 10,578,521 B1 | 3/2020 | Dinakaran et al. |
| 10,751,659 B2 | 8/2020 | Dobbyn |
| 10,976,212 B2 | 4/2021 | Kawasaki |
| 2003/0063687 A1 | 4/2003 | Kim |
| 2003/0078751 A1 * | 4/2003 | Juhasz .............. F04B 51/00 |
| | | 700/285 |
| 2006/0042359 A1 | 3/2006 | Morse et al. |
| 2006/0151013 A1 | 7/2006 | Tsuneta et al. |
| 2006/0272301 A1 | 12/2006 | Morse et al. |
| 2009/0249895 A1 * | 10/2009 | Mahler .............. B01D 46/442 |
| | | 73/863.23 |
| 2010/0116031 A1 * | 5/2010 | Xu .............. G01N 15/0625 |
| | | 73/38 |
| 2010/0154513 A1 | 6/2010 | Lin et al. |
| 2011/0044853 A1 | 2/2011 | Devine |
| 2011/0107819 A1 | 5/2011 | Chung et al. |
| 2011/0107917 A1 | 5/2011 | Morse et al. |
| 2011/0266904 A1 | 11/2011 | Stefanini et al. |
| 2012/0024694 A1 | 2/2012 | Mullapudi et al. |
| 2012/0272752 A1 | 11/2012 | Devine |
| 2013/0091678 A1 | 4/2013 | Morse et al. |
| 2014/0115852 A1 | 5/2014 | Morse et al. |
| 2016/0030871 A1 | 2/2016 | Krause |
| 2016/0096135 A1 | 4/2016 | Woolard |
| 2016/0097705 A1 | 4/2016 | Woolard |
| 2016/0136557 A1 | 5/2016 | Ragaller et al. |
| 2018/0031466 A1 | 2/2018 | Verma et al. |

FOREIGN PATENT DOCUMENTS

| | | | |
|---|---|---|---|
| CN | 205678777 U | 11/2016 | |
| CN | 106322540 A | 1/2017 | |
| CN | 107110735 A | 8/2017 | |
| CN | 107166557 A | 9/2017 | |
| CN | 108180592 A | 6/2018 | |
| CN | 112673214 A | 4/2021 | |
| DE | 3027351 A1 | 2/1981 | |
| EP | 0099129 A2 | 1/1984 | |
| EP | 1057515 A1 | 12/2000 | |
| EP | 1057515 A1 * | 12/2000 | ......... B01D 46/0086 |
| EP | 1431680 A1 | 6/2004 | |
| EP | 2196250 B1 | 2/2012 | |
| EP | 2090350 B1 | 5/2013 | |
| EP | 3847400 | 7/2021 | |
| IN | 202147014363 A | 4/2021 | |
| JP | H07243696 A | 9/1995 | |
| JP | 2929390 B2 | 8/1999 | |
| JP | 4423627 B2 | 3/2010 | |
| TW | 201223616 A | 6/2012 | |
| WO | WO2016053967 A1 | 4/2016 | |
| WO | WO2017216316 A1 | 12/2017 | |

OTHER PUBLICATIONS

Partial International Search Report issued in Application No. PCT/US2019/049973 dated Nov. 22, 2019.

Written Opinion and International Search Report issued in Application No. PCT/US2019/049973 dated Feb. 7, 2020.

Technical Datasheet, Unguided Linear Motion, MPP Series, UHV Design Ltd., Jurt J Lesker Company, Retrieved on Dec. 4, 2017 from www.lesker.com.

Zhang, et al. "A Blunt Sampling Probe Developed for an In Situ Leak Test of HEPA Filters in High-Level Laboratory," HVAC&R Research. Vol. 20, Iss. 2, 2014.

China National Intellectual Property Administration; First Office Action issued in Application No. 201980058380.5, 63 pages, dated Feb. 21, 2022.

30VERNMENT of India, First Examination Report issued in Application No. 202147014363, 6 pages, dated Aug. 22, 2022.

China National Intellectual Property Administration; Notice of Grant issued for Application No. 201980058380.5, 4 pages, dated Mar. 12, 2023.

* cited by examiner

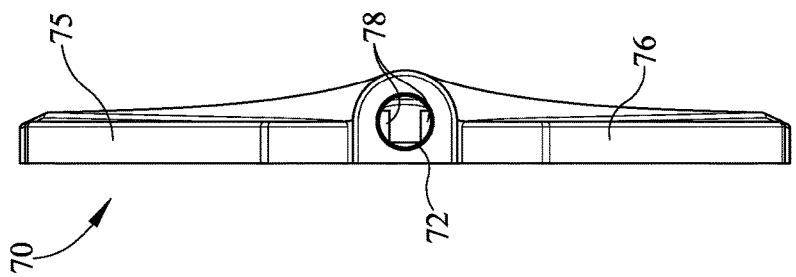
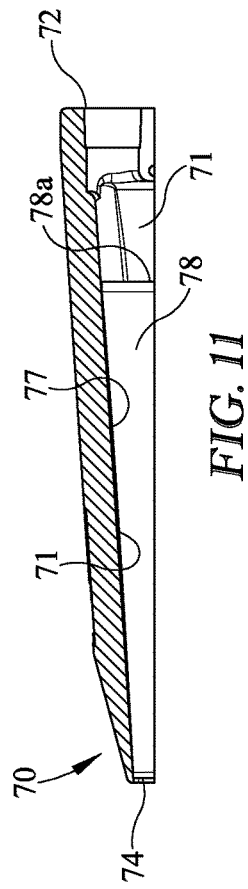
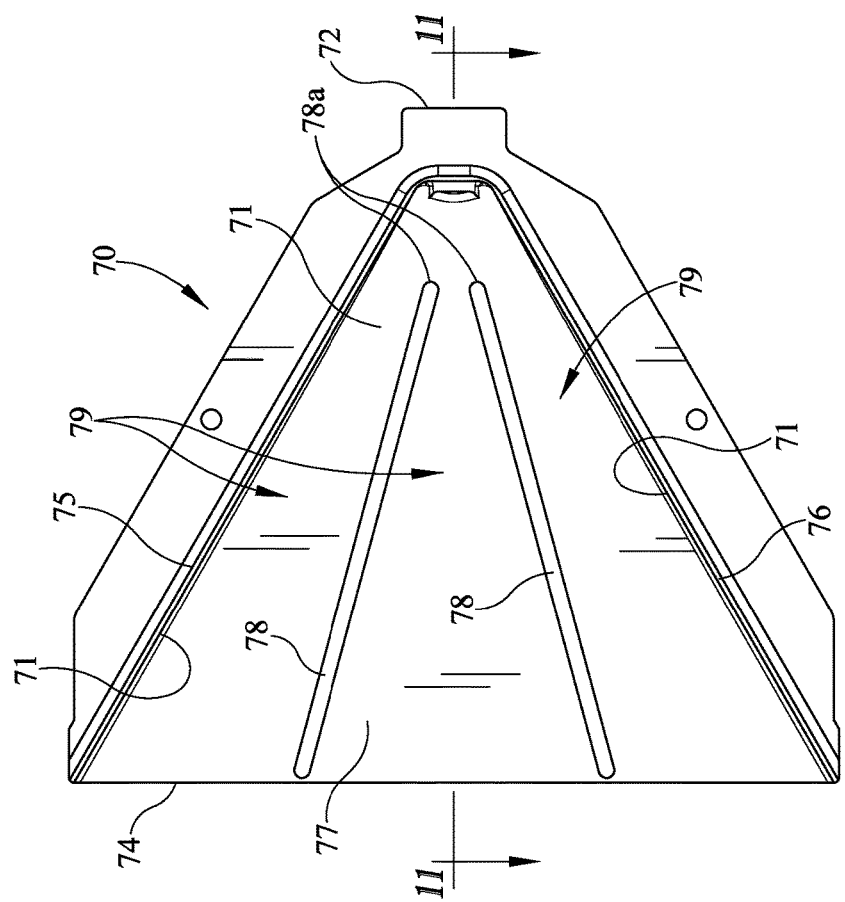
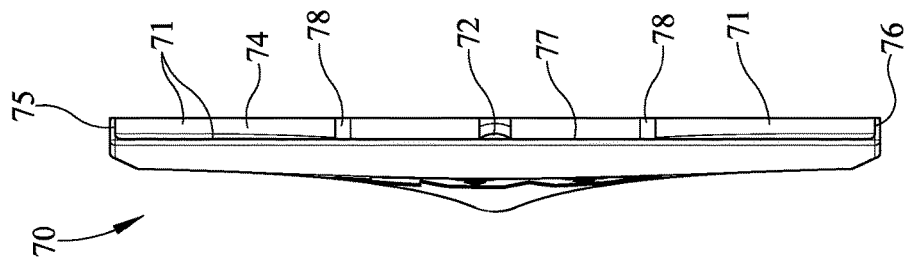

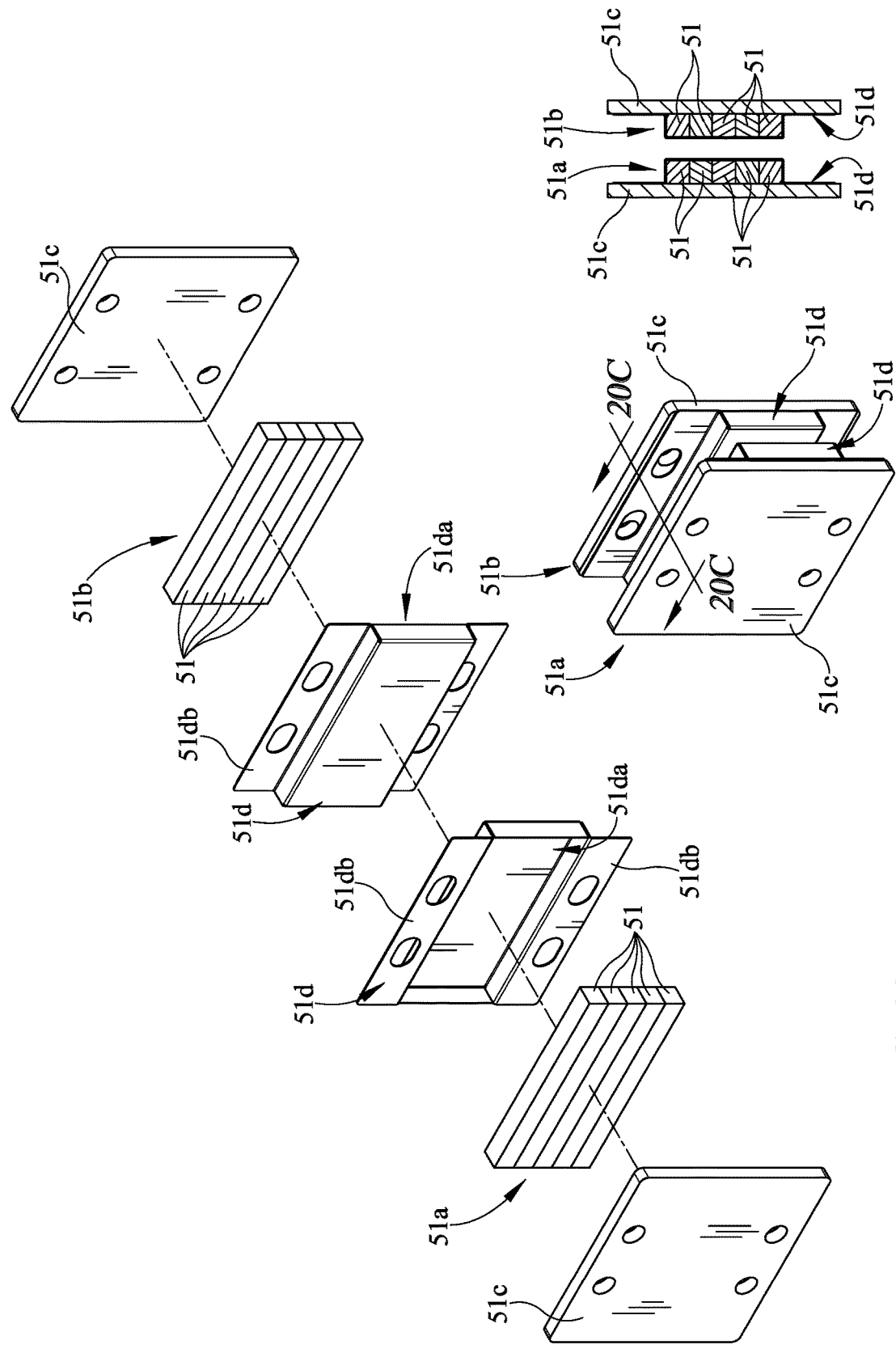

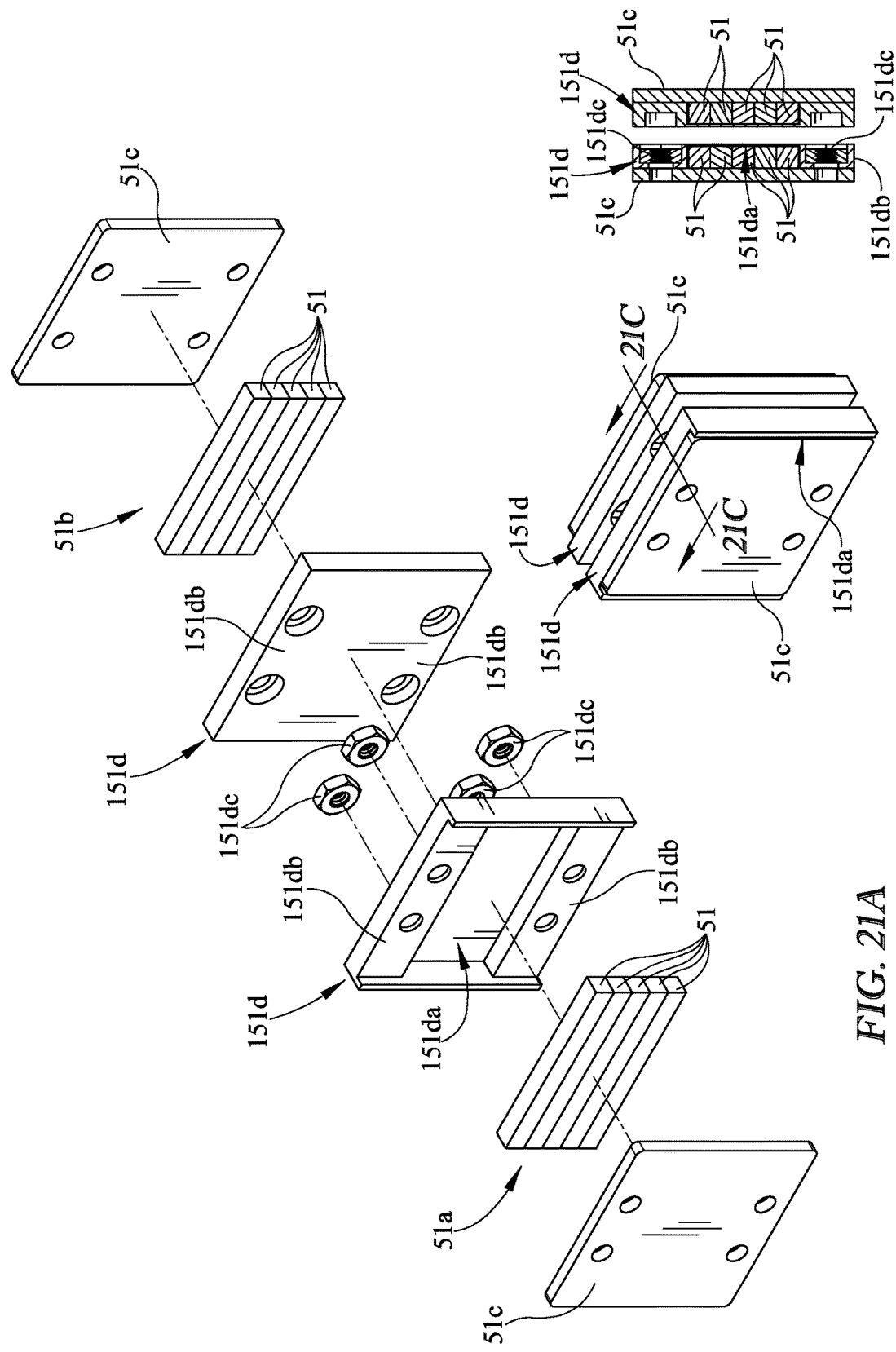

FILTER TESTING APPARATUS AND METHOD

BACKGROUND

The present invention relates to a method and apparatus for an air handling system and testing of a filter thereof.

Typical scan testing and validation include potential contamination crossing into the air passageway of the air handling unit. For example, an access door may be opened to gain access to a filter or one or more seals or gaskets may be used to insert scan probes or other equipment through the housing wall from the exterior to the interior. Thus, there is a need to reduce contamination in an air handling system.

SUMMARY

In some embodiments, an apparatus for introducing features to or monitoring characteristics of an air filter within an air handling system comprises a housing having an exterior side and an interior side, wherein the interior side may define an air passageway adapted to form a part of the air handling system having an air flow passing therethrough. In some embodiments, the air handling system may include one or more filter areas positioned within the interior side of the housing adapted to receive a replaceable filter media. Moreover, in some embodiments, the filter media may include a downstream face and an opposing upstream face. In various embodiments, the air handling system may include a first scan assembly positioned at least one of upstream and downstream of the one or more filter areas, wherein the first scan assembly may have a track system directing one or more depending arms within the air passageway in a transverse direction to the air flow. In some embodiments, the track system may include an exterior portion positioned on the exterior side of the housing and an interior portion positioned on the interior side of the housing. In some embodiments, the interior portion may include a carriage, an interior magnetic array, and the one or more depending arms slidingly engaging one or more first rails. In various embodiments, the exterior portion may include a drive member and an exterior magnetic array slidingly engaging one or more second rails, and an actuator, wherein the actuator may slide the drive member and the exterior magnetic array on the one or more second rails along the exterior side of the housing and correspondingly slides the carriage, the interior magnetic array, and one or more depending arms on the one or more first rails in the transverse direction along the interior side of the housing.

In addition, in some embodiments, the first scan assembly may be positioned downstream of the one or more filter areas. In various embodiments, the air handling system may include a second scan assembly positioned on the other of the at least one of upstream and downstream position of the first scan assembly. In some embodiments, the first scan assembly may have a first rate of travel for the drive member along the transverse direction and the second scan assembly may have a second rate of travel for the drive member along the transverse direction. In various embodiments, the first rate of travel and the second rate of travel may be the same or different from each other. In addition, in various embodiments, the one or more first rails may include a pair of linear rails parallel spaced from each other and in sliding engagement with the carriage. In some embodiments, the interior portion of the track system further comprises one or more linear bearings between the pair of linear rails and the carriage. In various embodiments, the exterior portion of the track system further comprises a lead screw driven by the actuator, the lead screw may slide the drive member along the one or more second rails. In some embodiments, the drive member may threadably engage the lead screw. In some embodiments, the interior magnetic array and the exterior magnetic array may be spaced from each other by the track system to provide a gap therebetween. In addition, in some embodiments, each one of the interior magnetic array and the exterior magnetic array may include a plurality of elongated magnets arranged perpendicular to the transverse direction relative to the air flow. In some embodiments, the actuator may be a servo motor. In various embodiments, the one or more depending arms of the interior portion of the track system may further comprise one or more devices. In some embodiments, the one or more devices may be at least one of a scan probe, a camera, a nozzle, a sensor, and an injector. In addition, in some embodiments, the one or more depending arms may comprise a spine defining a portion of one or more overlapping scan probes extending along a length of the spine. In some embodiments, the air handling system may include a fixed probe assembly in fluid communication with one or more injectors to validate test aerosol from the first scan assembly positioned upstream of the one or more filter areas.

In addition, in some embodiments, an apparatus for introducing features to or monitoring characteristics of an air filter within an air handling system, comprising a depending arm moveable in linear direction transverse to an air flow within an air handling system. In some embodiments, the depending arm may include an elongated spine extending for a length in a vertical direction. In various embodiments, the depending arm includes a plurality of scan probes that may be positioned along the length of the elongated spine. In some embodiments, each one of the plurality of scan probes may have an inner periphery defining an internal air passageway, wherein a portion of the inner periphery of each scan probe may be defined by a portion of the elongated spine.

In addition, in various embodiments, adjacent scan probes of the plurality of scan probes may overlap for a distance along the length of the elongated spine. In some embodiments, the adjacent scan probes may be positioned on opposing sides of the elongated spine. In some embodiments, each one of the plurality of scan probes may include one or more channels extending from an upstream inlet towards a downstream outlet of the scan probe. In various embodiments, the one or more channels may decrease in size towards the downstream outlet. In some embodiments, the one or more channels may be positioned in a vertical positon relative to each other. In various embodiments, the one or more channels may be defined by one or more protrusions extending from the inner periphery of the scan probe. In some embodiments, the one or more protrusions may be an elongated fin extending in the direction of the air flow. Moreover, in some embodiments, the elongated fin may extend from the upstream inlet to a distance spaced away from the downstream outlet. In various embodiments, the elongated fin may be transverse to a horizontal plane. In some embodiments, a pair of the elongated fins may taper towards each other in the direction of air flow towards the downstream outlet. In various embodiments, the elongated spine may define a portion of the upstream inlet and may not define the downstream outlet. In some embodiments, each one of the plurality of scan probes may include a three sided member tapering towards a downstream outlet coupled to a substantially planar lateral face of a the elongated spine.

In some implementations, an apparatus for introducing features to or monitoring characteristics of an air filter within an air handling system may comprise a housing having an exterior side and an interior side, wherein the interior side may define an air passageway adapted to form a part of the air handling system having an air flow passing therethrough. In some embodiments, the apparatus may include one or more filter areas positioned within the interior side of the housing adapted to receive a replaceable filter media. Moreover, in some embodiments, the filter media may include a downstream face and an opposing upstream face. In various embodiments, the apparatus may include a first scan assembly positioned upstream of the one or more filter areas. In some embodiments, the first scan assembly may include a track system directing one or more depending arms within the air passageway in a transverse direction to the air flow. In some embodiments, the track system may have an exterior portion positioned on the exterior side of the housing and an interior portion positioned on the interior side of the housing. In various embodiments, the interior portion may include a carriage, an interior magnetic array, and the one or more depending arms slidingly engaging one or more first rails. In some embodiments, the exterior portion may include a drive member and an exterior magnetic array slidingly engaging one or more second rails, and an actuator, wherein the actuator slides the drive member and the exterior magnetic array on the one or more second rails along the exterior side of the housing and correspondingly slides the carriage, the interior magnetic array, and one or more depending arms on the one or more first rails in the transverse direction along the interior side of the housing. In addition, in some embodiments, the one or more depending arms of the interior portion of the track system may further comprise one or more injectors directing at least one of a decontamination agent and an aerosol downstream towards the one or more filter areas that receive the replaceable filter media. In some embodiments, at least one of the interior portion and the exterior portion may include a cover attaching the interior magnetic array and the exterior magnetic array to a backing plate, respectively.

These and other advantages and features, which characterize the embodiments, are set forth in the claims annexed hereto and form a further part hereof. However, for a better understanding of the embodiments, and of the advantages and objectives attained through its use, reference should be made to the Drawings and to the accompanying descriptive matter, in which there is described example embodiments. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1 is a bottom perspective view a portion of the air handling system with the access door removed illustrating an embodiment of one or more scan assemblies;

FIG. 2 is a top perspective view the air handling system of FIG. 1 with a portion of an exterior portion exploded away from the scan assembly;

FIG. 3 is a sectional view of the embodiment of FIG. 1 taken along line 3-3

FIG. 4 is a close up sectional view of the embodiment of FIG. 3;

FIG. 5 is a perspective view of a first scan assembly and a second scan assembly of FIG. 1;

FIG. 6 is an exploded view of the first scan assembly of FIG. 5;

FIG. 7 is a perspective view of a portion or three-sided member of an embodiment of a scan probe;

FIG. 8 is an upstream inlet view of the scan probe portion of FIG. 7;

FIG. 9 is a side view of the scan probe portion of FIG. 7;

FIG. 10 is a downstream outlet view of the scan probe portion of FIG. 7;

FIG. 11 is a sectional view of the scan probe portion of FIG. 9 taken along line 11-11;

FIG. 12 is a perspective view of an embodiment of an interior magnetic array of a track system interior portion and a perspective view of an embodiment of an exterior magnetic array of the track system exterior portion;

FIG. 13 is a side view of the interior magnetic array and the exterior magnetic array of FIG. 12 illustrating relative alignment relative to each other and arrows indicating magnetic pole orientation of individual magnets;

FIG. 14 is a sectional view of an embodiment of a depending arm positioning a plurality of scan probes of FIG. 5 taken along line 14-14;

FIG. 15 is a sectional view of the depending arm positioning a plurality of scan probes of FIG. 5 taken along line 15-15;

FIG. 16 is a sectional view of the first scan assembly installed with the air handling system of FIG. 1 taken along line 16-16;

FIG. 17 is a schematic of an exemplary testing configuration for the driving magnetic array and the driven magnetic array;

FIG. 18 is a partial side sectional view of another embodiment of an air handling system illustrating a validation or measurement configuration of a probe assembly, with the filter removed from the air passageway;

FIG. 19 is a sectional view of FIG. 18 taken along line 19-19;

FIG. 20A is an exploded perspective view of another embodiment of an interior magnetic array of a track system interior portion and the exterior magnetic array of the track system exterior portion illustrating an embodiment of a cover;

FIG. 20B is an assembled view of FIG. 20A;

FIG. 20C is a sectional view of FIG. 20B taken along line 20C-20C;

FIG. 21A is an exploded perspective view of another embodiment of an interior magnetic array of a track system interior portion and the exterior magnetic array of the track system exterior portion illustrating another embodiment of a cover;

FIG. 21B is an assembled view of FIG. 21A; and

FIG. 21C is a sectional view of FIG. 21B taken along line 21C-21C.

DETAILED DESCRIPTION

Numerous variations and modifications will be apparent to one of ordinary skill in the art, as will become apparent from the description below. Therefore, the invention is not limited to the specific implementations discussed herein.

As illustrated in the Figures, one or more scan assemblies 20, 30 may be used within an air handling system 10 to test, monitor, and/or introduce material to one or more filters 40 within the air flow A of the air passageway 11. The housing 12 of the air handling system 10 may have an exterior side 12a and an interior side 12b. The interior side 12b may define the air passageway 11 having the air flow A passing therethrough. A sealed access door, removed for clarity in the Figures, may provide access into the passageway to access the one or more filter areas adapted to receive or defining the replaceable filter media or filter 40 (e.g. remove, install, repair, etc.). Moreover, although not shown, one or more dampers may be used within the housing upstream and/or downstream of the filters position. The one or more filters 40 may be a variety of constructions, quantities, and materials with a variety of characteristics (e.g. a HEPA filter, ePTFE). The filter includes an upstream face 42 and an opposing downstream face 44.

Figure 2:
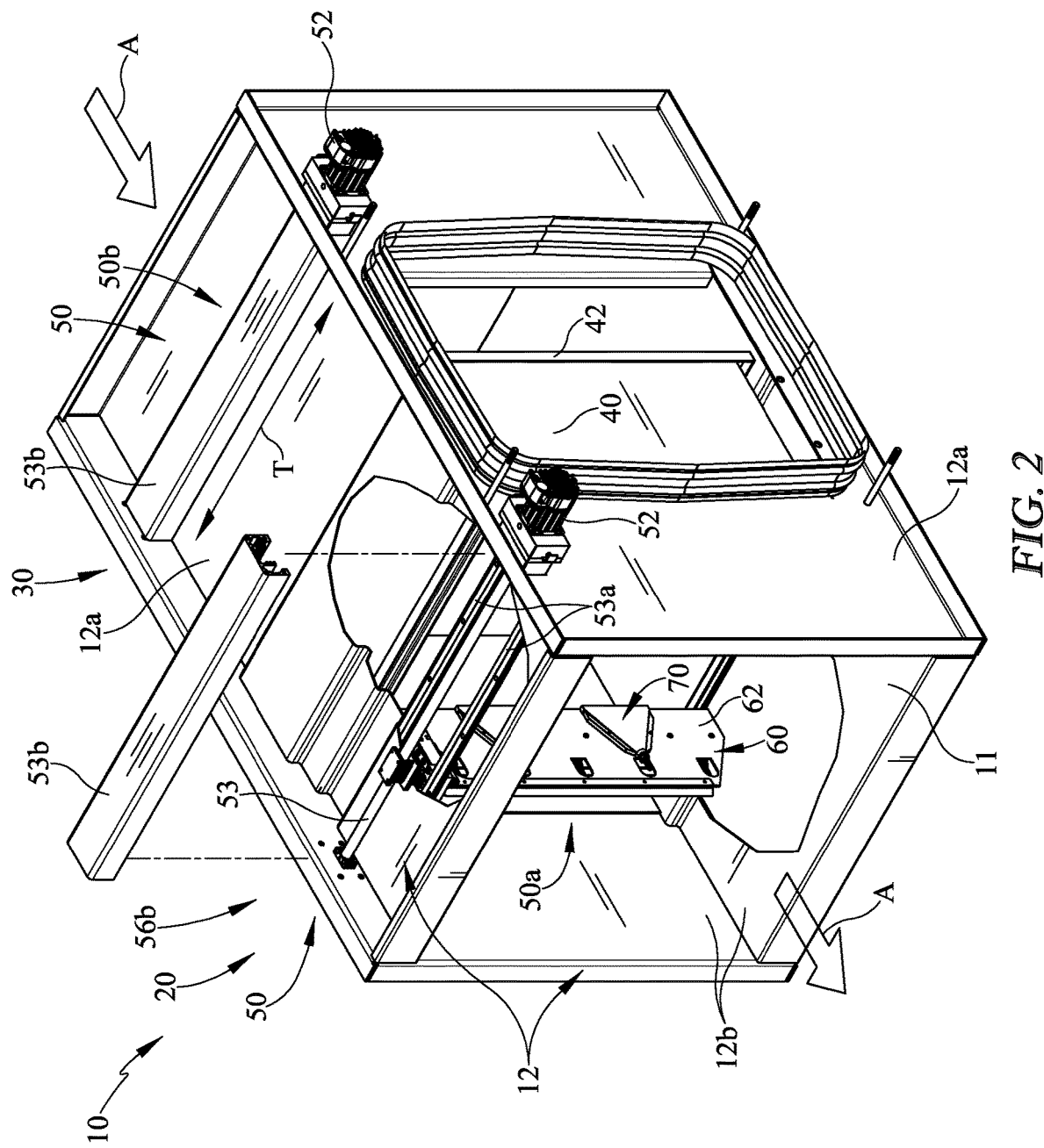
Figure 3:
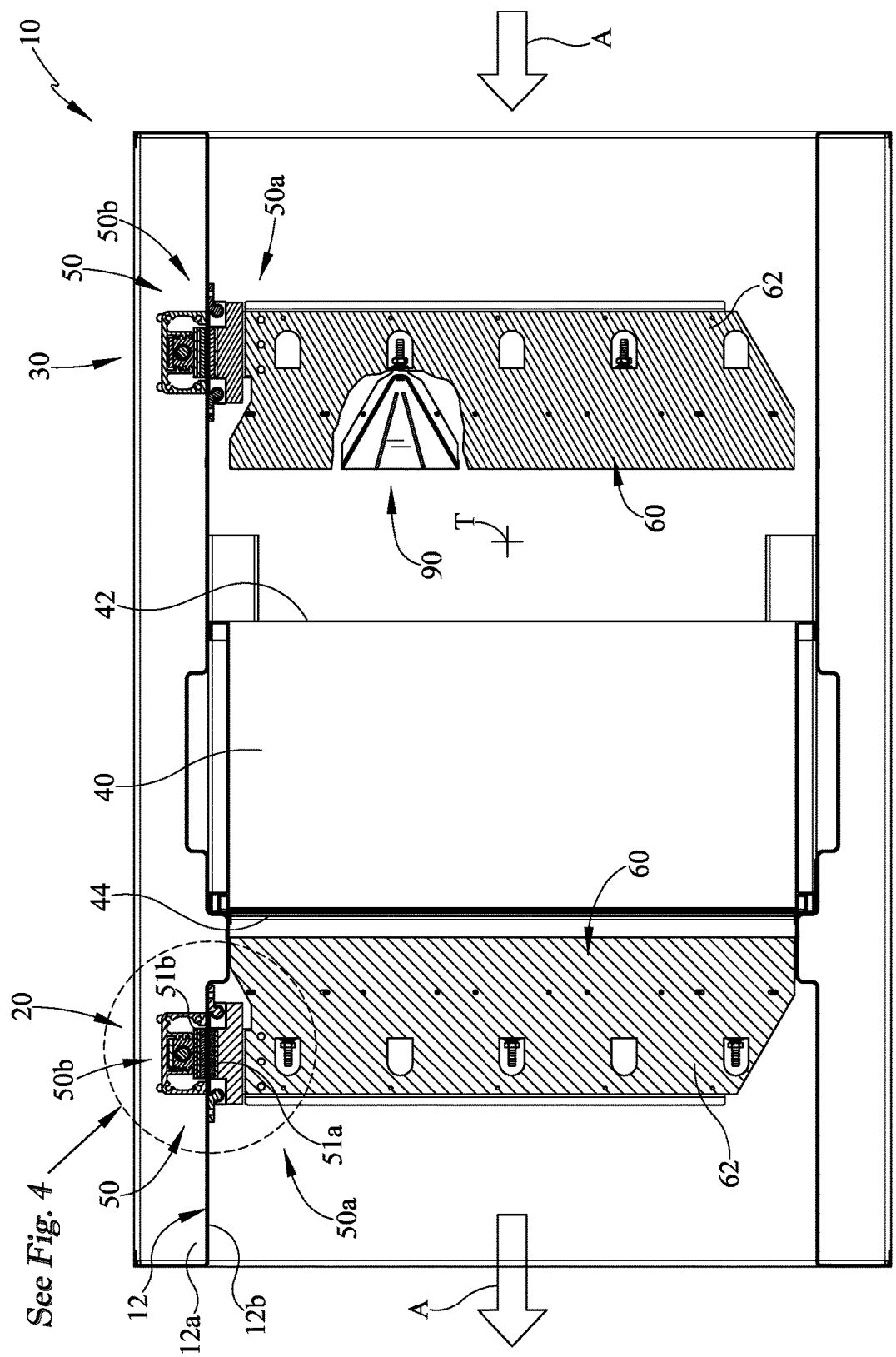

The scan assembly 20, 30 utilizes magnetic forces to facilitate the relative movement between an interior portion 50a and an exterior portion 50b of a track system 50 through the housing 12 (e.g. one or more walls or top wall). The track system 50 may have an interior portion 50a that can be positioned traverse to or laterally (e.g. transverse, linear, or direction of travel) relative to the direction of air flow A. The direction of travel or transverse direction T is shown more clearly in FIG. 2. The interior portion 50a, within the sealed interior side 12b, is actuated via the exterior portion 50b outside of or on the exterior side 12a of the housing. The interior portion 50a may be slidingly moved to a variety of positions along the transverse or travel direction without mechanical contact from the exterior portion 50b thereby maintaining a sealed or unbroken interior side or air passageway. The scan assembly 20, 30 may reduce or eliminate contamination into the interior side 12b of the housing 12 during operation and/or testing. The scan assembly 20, 30 may be positioned upstream and/or downstream of the filter areas or filter 40 within the air handling system 10. Although the scan assembly 20, 30 may be shown as interacting with or monitoring the filter 40 (e.g. in a variety of upstream or downstream directions) in the embodiments, the scan assembly may be used at variety of other positions within the system for a variety of tasks (e.g. sampling, visual analysis, introduce one or more material, decontamination, etc.). The exact pattern and rates of the transverse movements or travel of one or more of the track systems 50 or scan assemblies 20, 30 may vary and may be controlled by a controller or other devices (not shown).

Figure 4:
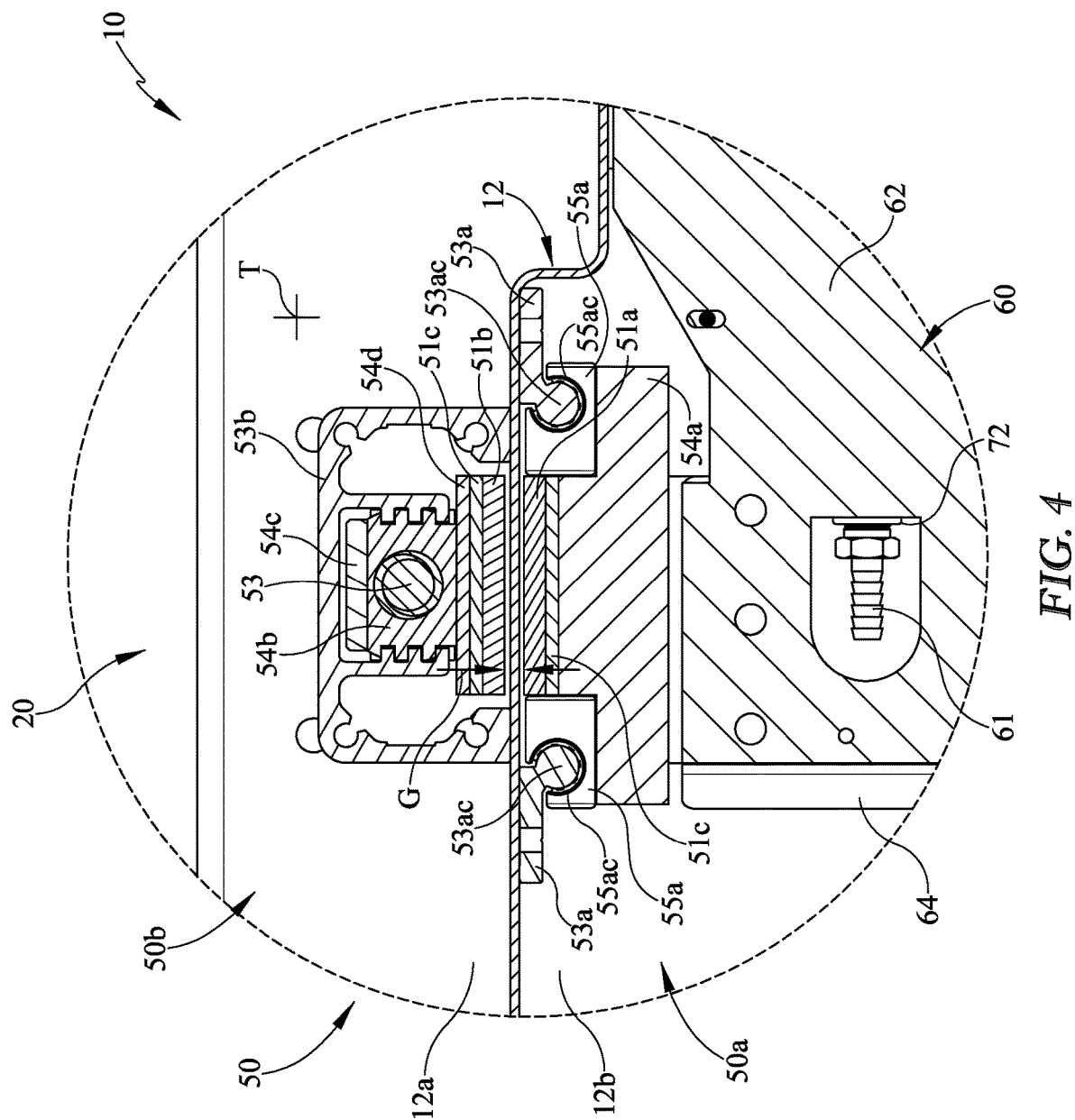
Figure 13:
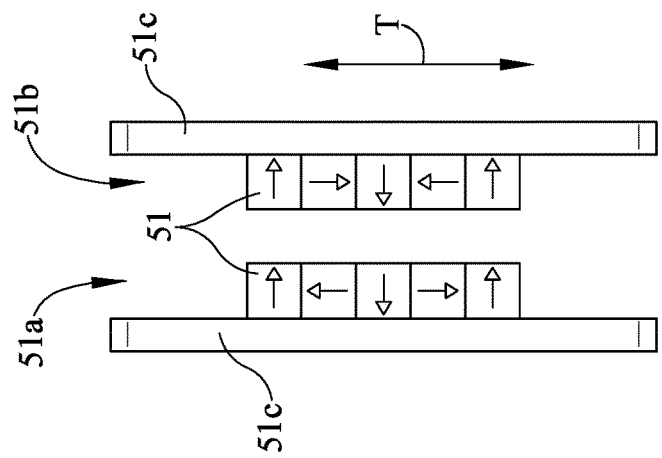
Figure 12:
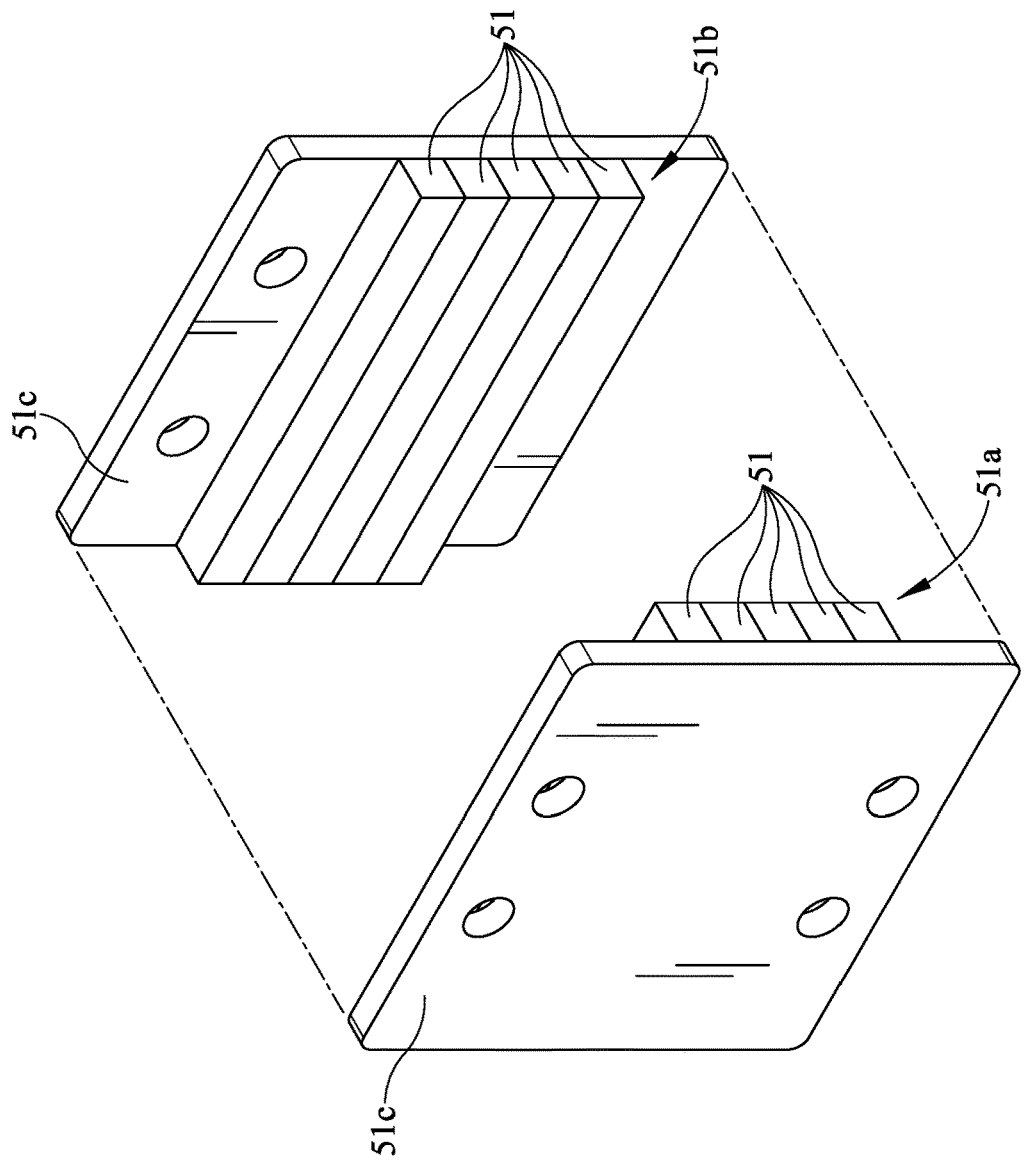

In the implementation shown, the exterior portion 50b and interior portion 50a of the track system 50 includes a plurality of magnets. The plurality of magnets of one or more corresponding portions may be arranged in an array 51a, 51b to provide the linear translation of relative movement between the exterior and interior portions 50a, 50b. The exterior portion 50b drives the interior portion 50a along the transverse direction T. In the one embodiment shown more clearly in FIGS. 12 and 13, each magnet 51 may be a rectangular shape and positioned as plurality of adjacent magnets in a horizontal plane. Moreover, each magnet 51 may have an embodiment of a polarity and orientation relative to another adjacent magnet 51 and/or portion 50a, 50b. The magnetic orientation of the magnets in the array may optimize the attract and repel forces to contain and direct the forces of attraction associated with the north and south pole magnetic coupling fields. This arrangement of permanent magnets that augment the magnetic field on one side of the array while canceling the field to near zero on the other side, creating an array that has a strong side and a weak side may be known as a Halbach array. This may be achieved by having a spatially rotating pattern of magnetization. Moreover, the field may be twice as large on the side on which the flux is confined and there may be little or no stray field produced on the opposite side. This may also minimize magnet size and provide field confinement. As shown in FIG. 13, the inside magnet array 51a includes one embodiment of the magnetic array polarity/direction or magnetic pole orientation of individual magnets 51. Moreover, the exterior magnet array 51b includes one embodiment of the magnetic array polarity/direction or magnetic pole orientation of individual magnets 51. Moreover, as shown in the Figures, each elongated magnet 51 of the corresponding array 51a, 51b may be orientated perpendicular or transverse to the transverse direction T of travel. In the one embodiment shown, the interior magnetic array 51a and the exterior magnetic array 51b may be a N45SH magnet material with a magnetic coating Ni—Cu—Ni. Each array 51a, 51b may be mounted to a backing plate 51c made of a SS304 material. In various embodiments, the mounting bolt pattern of the backing plates 51c may be different such that the particular magnetic arrays are keyed to either the interior portion or exterior portion. In some embodiments, the arrays 51a, 51b may be bonded to their corresponding backing plate 51c using a 3M DP-420 or equivalent. Instead of or in combination with the adhesive, one or more mechanical retaining devices or fasteners (e.g. covers and/or screws) may be used to attach the one or more magnet arrays (e.g. 51a and/or 51b) to the backing plate 51c, respectively. These one or more retaining devices may be made of a metal, plastic, and/or other low magnetic material in some embodiments. As shown more clearly in FIG. 4, the exterior magnetic array 51b may be offset or spaced from the interior magnetic array 51a to create a gap or spacing G to operably control the magnetic forces/flux or relative reactions or transfer between the interior portion 50a and the exterior portion 50b. In the one embodiment shown, the gap G may be about 0.2 inches. The gap G of the non-magnetic portion of the magnetic circuit separates the inwardly facing surfaces of the arrays 51a, 51b. Although the gap G between magnetic arrays may be air and the housing 12 as shown, additional nonmagnetic materials may be used therebetween. By using the air within the gap, in some embodiments, friction may be reduced. The gap or gap range may also provide space for a shim(s) on the exterior/interior portions for fine tuning of the magnet gap or range of the gap if necessary. The magnet arrays or configuration may be a variety of materials, quantities, positions, shapes, sizes, and constructions and still be within the scope of the invention. For example, one or more programmable magnets may be used.

In some implementations, the one or more retaining devices may be a cover or plate 51d, 151d to attach the one or more magnetic arrays (e.g. 51a and/or 51b) to the backing plate 51c, respectively. As shown in the one embodiment in FIGS. 20A-20C and another embodiment in FIGS. 21A-21C, the retaining device may be a cover 51d, 151d disposed over one or more of the magnetic arrays 51a, 51b or portions thereof. As is shown, both magnetic arrays 51a, 51b may include the cover 51d, 151d, respectively. Alternatively, in some embodiments, one magnetic array may include the cover and the other magnetic array may not include a cover. The one or more covers 51d, 151d, if used, may include a compartment 51da, 151da to receive and position the magnetic array with the backing plate 51c. The cover 51d, 151d may also include a pair of flanges 51db, 151db with one or more apertures to receive one or more fasteners to engage the backing plate 51c. One or more fasteners and/or adhesive may attach the cover (e.g. through the flange apertures) to the backing plate (e.g. backing plate apertures). In the one embodiment shown in FIGS. 21A-21C, at least one cover 151d may include one or more recesses (e.g. hex shaped) adjacent the apertures within the flanges 151db to receive one or more nuts 151dc (e.g. hex shaped) to attach the cover 151d to the backing plate 51c via one or more fasteners (e.g. bolts). Moreover, the cover 51d, 151d may be a variety of materials, shapes, sizes, and constructions and still be within the scope of the invention, if used. For example, the cover 51d shown in FIGS. 20A-20C may be made of metal (e.g. low magnetic material). In other embodiments, as shown in FIGS. 21A-21C, the cover 151d may be made of plastic.

An exemplary measurement test was conducted for one embodiment of the magnetic configuration, illustrating a basic strength relationship of the magnets. The conditions included: the gap 1 between the exterior magnetic array 2 and the interior magnetic array 3 to be 0.2 inches, an offset 4 in the transverse direction between the arrays being 0.1 inches for the finite element analysis (FEA), individual block 5 size being 2 inch (ref 8)×0.2 inch (ref 7)×0.2 inch (ref. 7) (M), magnet materials EEC-N45H or EEC SmCo-33 magnet, total magnet weight for all 10 magnets without housing is about 0.22 lbs for N45H and 0.25 lbs for SmCo-33, the linear motion direction 6 the driver or exterior array 2 mounted on a linear motor and the driven or interior magnetic array 3 supporting a sensor structure. The exemplary configuration is shown in FIG. 17 and the calculations are shown below in the chart for the driver magnetic array 2 on the top outside and the driven magnetic array 3 on the bottom inside of the ventilation tube.

| Design Option | Exterior Magnet Array | Interior Magnet Array | Magnetic Force along the Y axis (lbs) | Magnetic Force along the Z-axis (lbs) |
|---|---|---|---|---|
| 1 | N45H | N45H | 22 | 25 |
| 2 | SmCo-33 | SmCo-33 | 16 | 18 |
| 3 | N45H | SmCo-33 | 19 | 21 |

Figure 17:
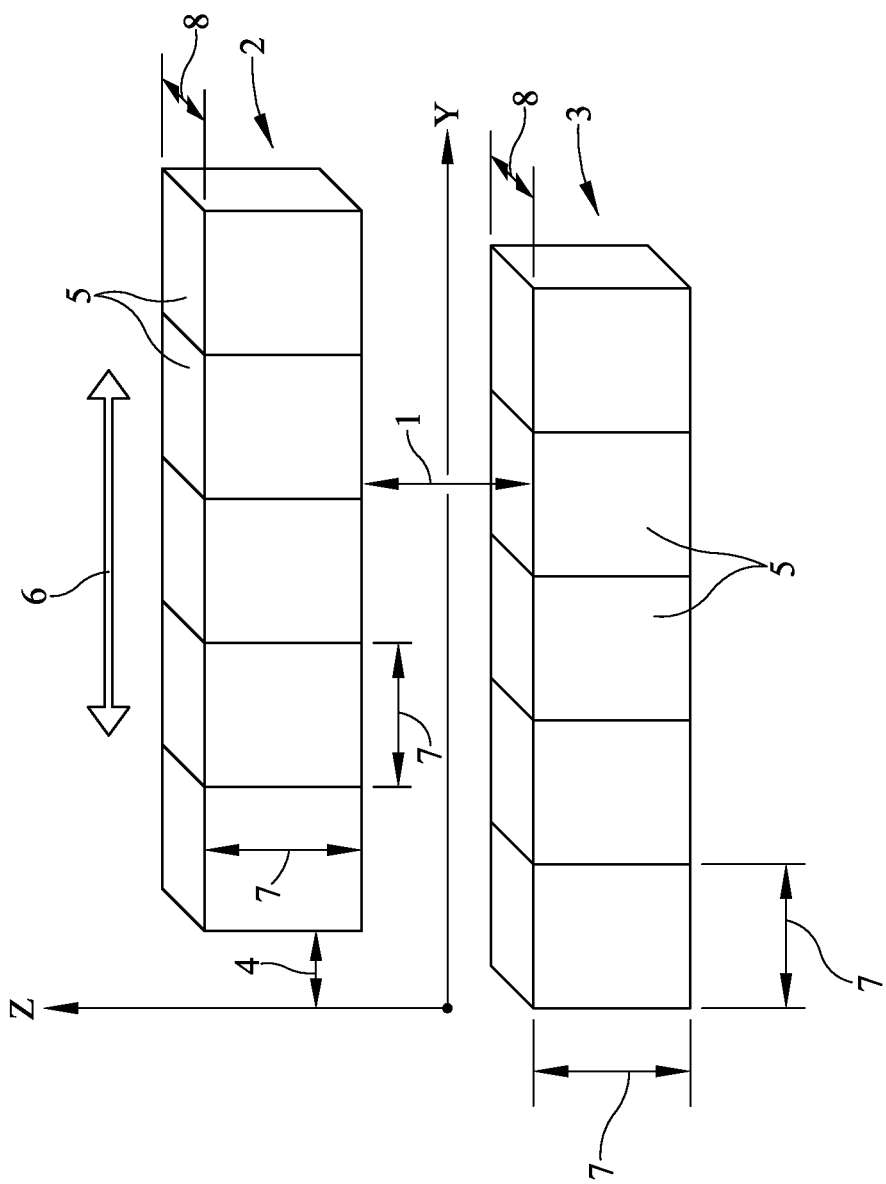

The analysis provided the force may be varied depending on the offset 4 of 0.1 inch as shown in FIG. 17. The linear coupling force was found to be proportional to the magnet strength. Operating temperatures of about 50 degrees Celsius of less reduced demagnetization. The 0.2 inch gap used in the study may allow for the housing material thickness of about 0.08 inches leaving approximately 0.12 inches for manufacturing tolerances or the possibility of a thicker housing wall. While a thinner air gap increases the magnetic coupling strength, it also increases the load on the linear bearings which then increases the drag of the interior portion and exterior portion.

One implementation of the exterior portion 50b of the track system 50 may be mounted above the upper/top wall of the housing 12 in the exterior 12a. As such the interior portion 50a of the track system 50 may be mounted within the interior 12b of the housing 12 adjacent the upper/top wall in the transverse direction T of travel. In use, the exterior portion 50b may be installed, replaced, subsequently added to the air handling system 10 as an add-on or upgrade, or repaired without entering the sealed air passageway 11, housing wall 12, and/or interior 12b of the housing. The exterior portion 50b may also be transferred between a first lower portion at one location and second lower portion located at another location (e.g. locations on one or more air handling systems) to operate the corresponding location or scan assembly in some embodiments. As shown in the Figures, the exterior portion 50b may be mounted to the sidewalls and extend across the upper wall of the housing in the transverse direction T. Although the exterior portion 50b may be mounted at a single end at the housing 12 as shown in the Figures, adjacent the actuator 52, the opposing ends may be mounted between the uprights of the sidewalls or at a variety of locations with the housing. Although not shown, in some embodiments, the exterior portion may be secured to a portion of the upper wall. It should be understood that the interior and exterior portions 50a and 50b may be independently mounted or secured to the housing. For example in use, removing the exterior portion of the track system does not require the interior portion be removed or accessed. Alternatively stated, separation of the magnetic arrays or breaking the magnetic circuit does not allow the interior portion to fall away or separate from the housing.

In use, the interior portion 50a may be installed, replaced, subsequently added to the air handling system as an add-on or upgrade, or repaired. In addition, the housing 12 may be decontaminated while manipulating the interior portion. In various embodiments, the mounting bolts, mount, or fasteners may be preinstalled within the interior 12b of the housing 12. As such, the interior portion 50a may be installed or the air handling system upgraded with reduced field fabrication (e.g. reduced or no drilling, welding, burning, etc.)

One or more scan assemblies 20, 30 may be used in the air handling system 10. In the one embodiment shown, two scan assemblies 20, 30 may be positioned adjacent the air filter on the housing. In some embodiments, a single scan assembly may be used. A first scan assembly 20 may be positioned downstream of the filter area or air filter 40 and a second scan assembly 30 may be positioned upstream from the filter area or air filter 40. For convenience, one embodiment of the first track system 50 of the first scan assembly 20 will be discussed in more detail. The first track system 50 may be positioned downstream of the filter area or air filter 40 on the housing 12 to translate a portion of the interior portion 50a in the transverse direction T across the downstream face 44 of the air filter 40 or filter area.

In the embodiment shown in the Figures, the exterior portion 50b of the track system 50 may be mounted to the exterior of the housing 12 in a variety of locations. The exterior portion 50b drives the interior portion 50a within the sealed air passageway 11 via the interior and exterior magnetic array 51a, 51b. In some embodiments, the exterior portion 50b may include a rail, slide, or channel 53b slidingly engaging the exterior magnetic array 51b outside the housing 12. Moreover, a magnetic drive member or carriage 54b may mount the exterior magnetic array 51b with the channel 53b. The drive member 54b may be a self-lubricated plastic in some embodiments (e.g. PEEK or TRIBO). The channel 53b may be extruded stainless steel or aluminum. The actuator 52 may translate or slide the drive member/exterior magnetic array relative to the channel. The actuator 52 advances the moveable portion of the interior portion 50a along the length or portion thereof of the track system 50. The actuator 52 may be a servo motor in some embodiments as shown, however the actuator may be pneumatic, belt driving, cable driving, portable drill, stepper motors, and/or hydraulic, etc. Although the embodiment shown of the track system 540 is motor driven or automatically driven, it should be understood that the drive member may be manually operated (e.g. push-pull device, crank assembly, etc.) in some embodiments. Further, in various embodiments, two or more scan assemblies may be operated by a single actuator and/or connected via a gear or linkage mechanism. The exterior portion 50b may include a lead screw 53 threadably engaging threads (e.g. internal) of the drive member 54b in some embodiments. The lead screw 53 may be coupled to the actuator 52 with a splined coupling 52b. The drive member 54b may be internally threaded to engage the lead screw as shown in the Figures. An actuator face plate 52c, actuator motor connector 52d, and/or motor quick disconnect 52e may be mounted on the housing to position the exterior portion as shown more clearly in FIG. 16. This motor engagement may provide for a quick disconnect of the actuator or motor.

In some implementations, the drive member 54b of the exterior portion 50b may include structure to position or mount the exterior magnetic array 51b. For example, a top plate 54c and a bottom plate or spacer 54d may be positioned on corresponding upper and lower sides of the drive member 54b. The exterior magnet array 51b and/or backing plate 51c may be mounted below the bottom plate 54d. The top plate 54c may be plastic in some embodiments. The bottom plate 54d may be plastic, stainless steel, and/or aluminum in various embodiments. The drive member 54b of the exterior portion 50b may position the exterior magnet array 51b from the housing 12 (e.g. 14 gage stainless steel) and/or interior magnetic array 51a (e.g. gap G).

In some implementations, the interior portion 50a may include one or more interior rails, tracks, or channels 53a slidingly engaging the interior magnet array 51a. One or more rails or tracks 53a may be secured to the interior of the upper wall of the housing 12. As shown in the embodiment, a pair of linear rails 53a may be used. The rails 53a may include elongated rods 53ac. The rails 53a may be stainless steel or anodized aluminum. In some embodiments, the interior portion 50a may include a carriage block 54a positioning the interior magnetic array 51a and/or backing plate 51c relative to the housing 12, exterior portion 50b, and/or exterior magnetic array 51b (e.g. gap G) along the rails 53a. The carriage block 54a may be aluminum in some embodiments. In some embodiments, one or more bearing blocks 55a and/or one or more linear bearings 55ac may be used to slidingly engage the rails 53a and/or rods 53ac to the carriage block 54a. The bearing blocks 55a may be anodized aluminum with replaceable linear bearings 55ac (e.g. self-lubricated plastic or TRIBO plastic liners). The bearing blocks 55a may slidingly engage the rails and/or elongated rods along the linear direction for a desired length.

A variety of devices or structure used to sample, test, introduce material into the air handling system and/or towards the filter may be attached to the interior portion 50a or one or more carriage blocks 54a traveling or sliding along the linear rails 53a within the air passageway 11. The structure may depend downwardly from the carriage block 54a. In some embodiments, the depending structure may include one or more depending arms. In some implementations as shown, the first scan assembly 20 may include one or more depending arms 60 shown in a fixed or vertical orientation relative to the carriage 54a. Although other orientations and/or movement relative to the carriage should be understood to be within the scope of the invention. The arms 60 may include one or more scan probes 70 to sample the air downstream of the filter area/filter 40 or from the filter (e.g. sampling). The one or more scan probes 70 may receive challenge material to calculate leaks and/or location of the leaks across the downstream face 44 of the filter area/filter 40. A tube fitting 61 adjacent the downstream outlet 72 of the scan probes 70 may include one or more tubes (not shown) for reading/testing samples to transfer to a variety of test equipment. In some embodiments, the arms and/or probes may be of a unitary or single piece construction (e.g. single molded piece). The arms and devices (e.g. scan probes) may be a variety of materials, quantities, positions, shapes, sizes, and constructions and still be within the scope of the invention.

Although the interior portion in the one embodiment is shown having one depending arm, it should be understood that the interior portion 50a may include a plurality of depending arms 60. Each arm of the interior portion may carry the same or different devices relative to another arm (e.g. one arm with scan probes and another arm with injectors/dispersion probes). Moreover, each arm may have a variety of devices (e.g. arm with both scan probes and sensors). For example, in various embodiments, the interior portion may have two depending arms each for scanning particles (e.g. the arms may be attached to the same magnet array/carriage block or different magnet arrays/carriage block). In some embodiments, the interior portion or carriage with two depending arms, one arm with scanning probes and the other arm with aerosol injectors. It should be understood that the arms depending from the interior portion or carriage block may be in a variety of positions or ordinations relative to each other and may travel along the one or more tracks in a variety of positons relative to each other (e.g. same or different rates or positions along the rail(s)).

For example, in one embodiment of an air handling system may include two HEPA filters in series, each filter may be scan tested. The system may have a first interior and exterior portion upstream of the upstream or first HEPA filter to inject aerosol downstream, a second interior and exterior portion downstream of the first HEPA filter and upstream of the downstream or second HEPA filter to scan test the first HEPA filter, a third interior and exterior portion downstream between the first HEPA filter and the second HEPA filter to inject test aerosol into the second HEPA filter, and a fourth interior and exterior portion downstream of the second HEPA filter to scan test the second HEPA filter. Alternatively, a single interior and exterior portion/carriage block may include a depending arm(s) with scan probes to scan test the first HEPA filter and aerosol injection nozzles to inject test aerosol into the downstream second HEPA filter.

Figure 5:
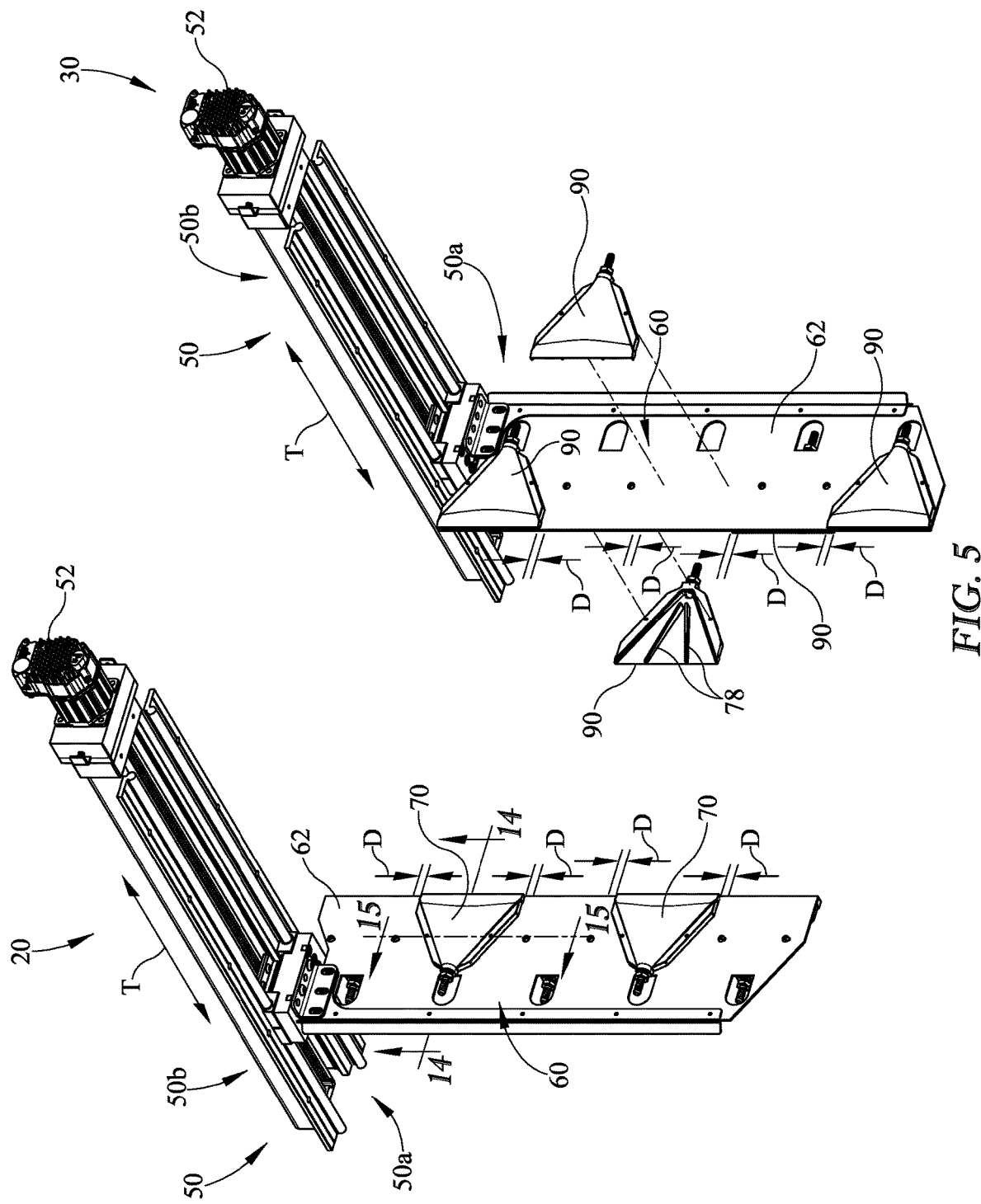
Figure 16:
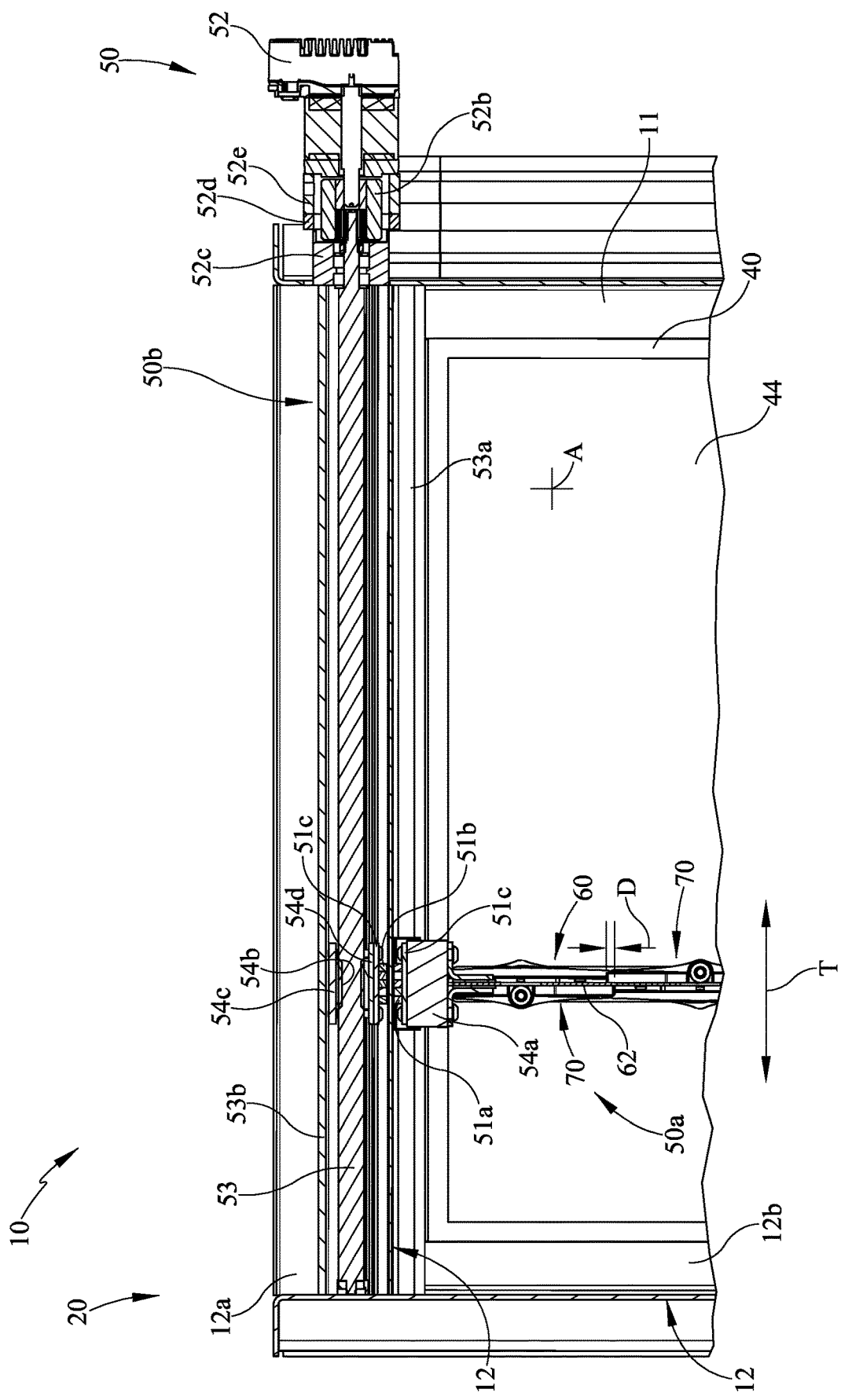

In one implementation as shown more clearly in FIGS. 5 and 16, a plurality of scan probes 70 may be in an overlapping arrangement along the length of the one or more depending arms 60. Adjacent probes overlap for a distance or length D in the vertical direction.

Figure 6:
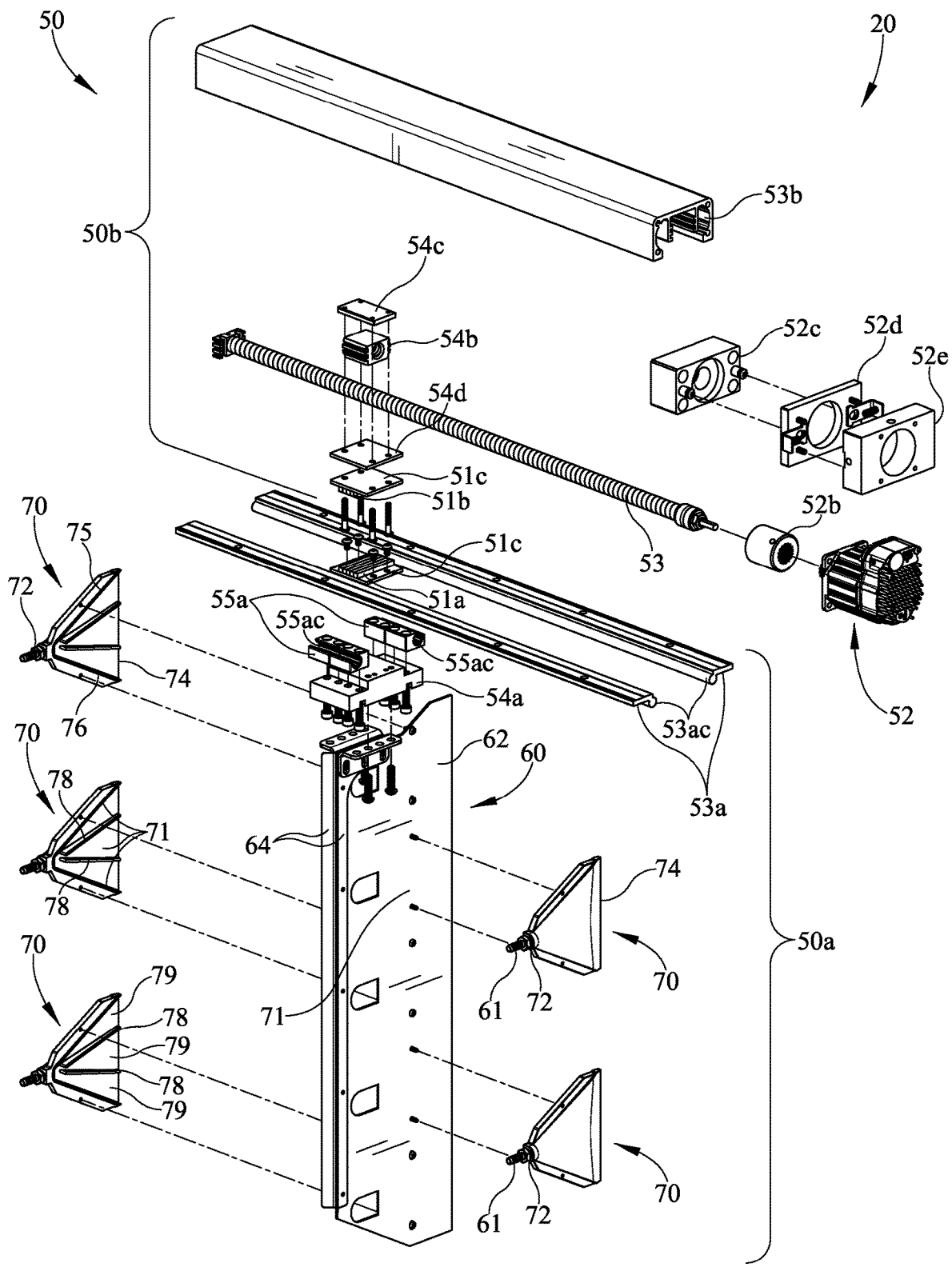
Figure 7:
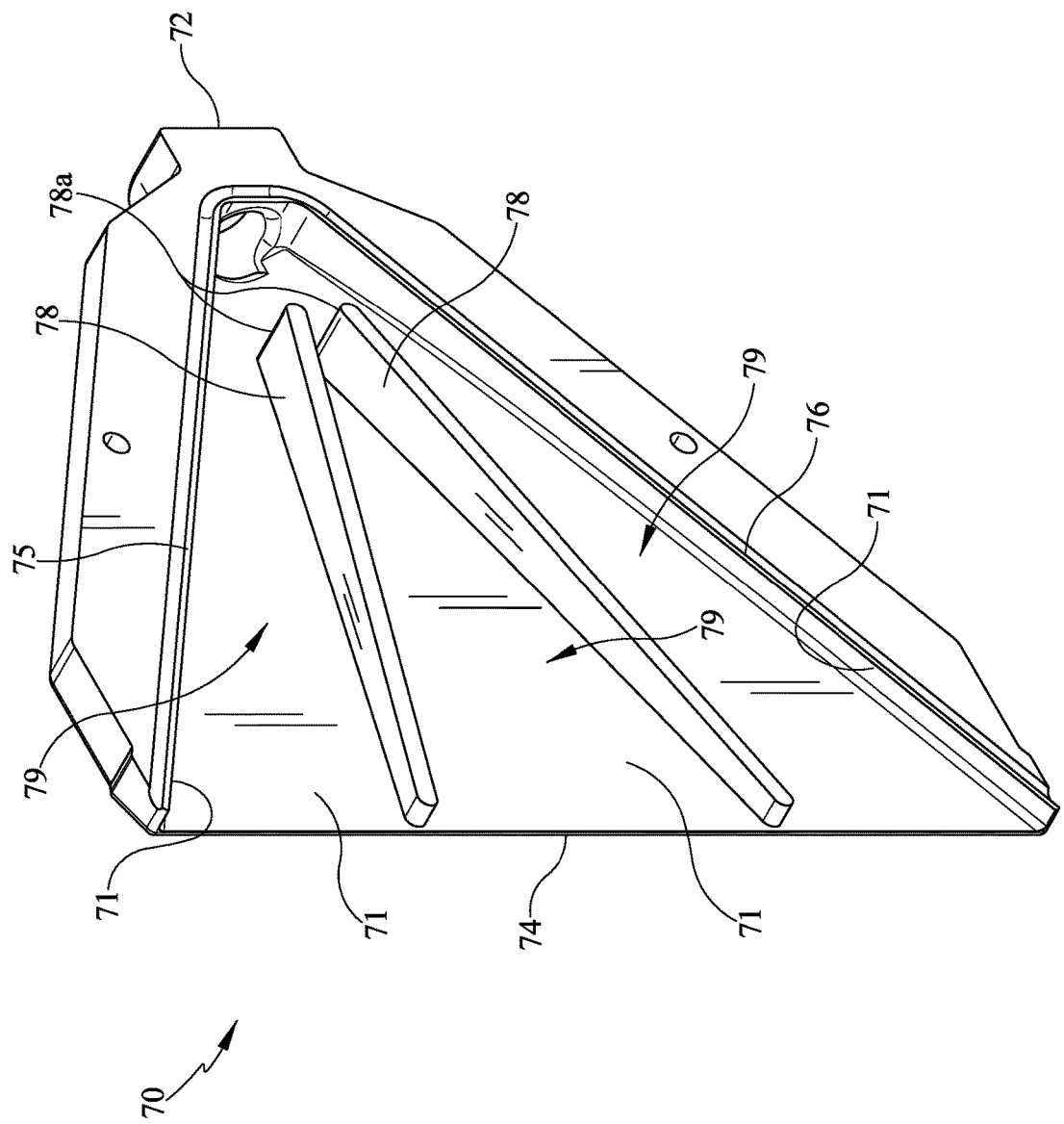
Figure 14:
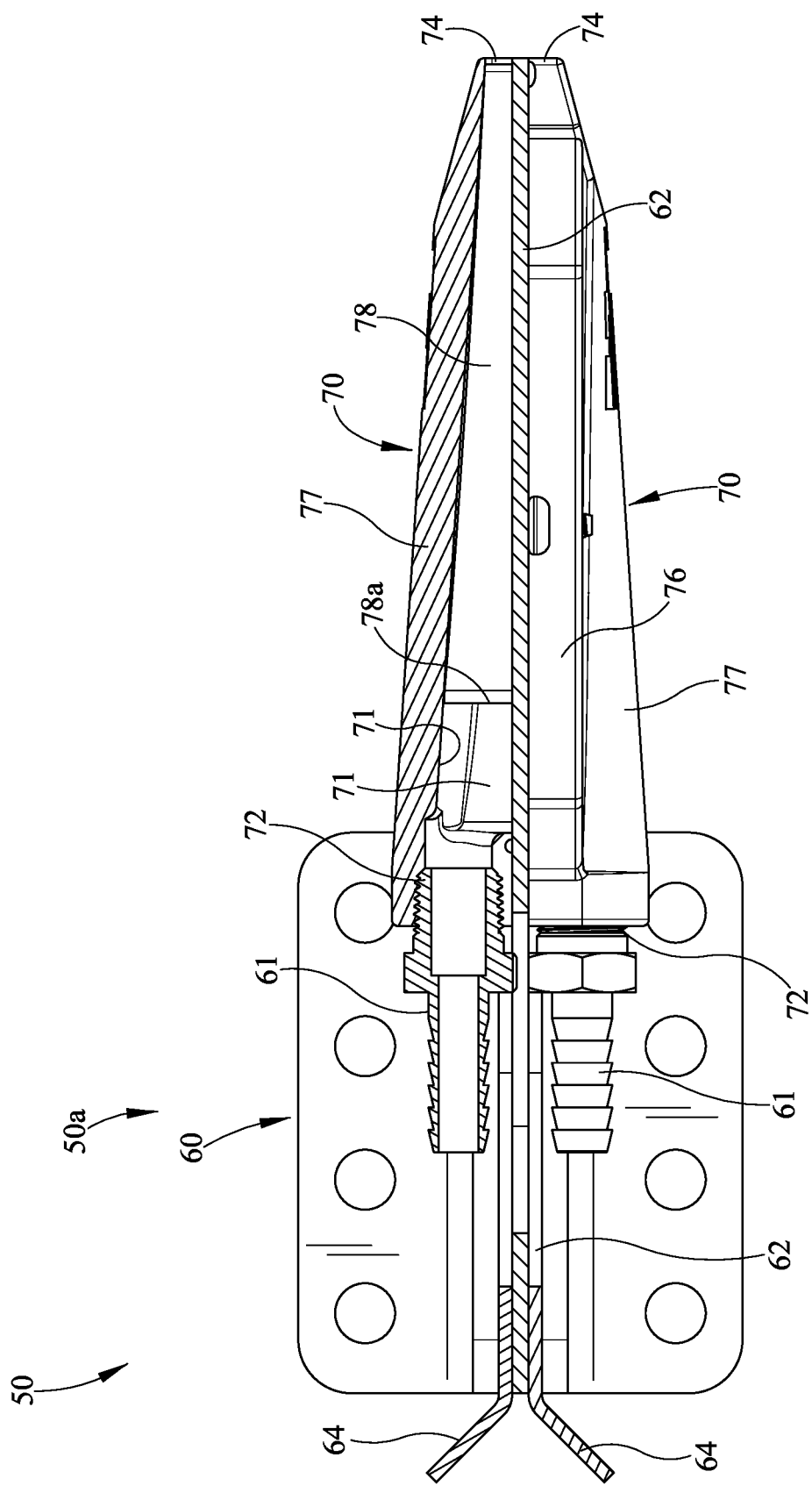
Figure 15:
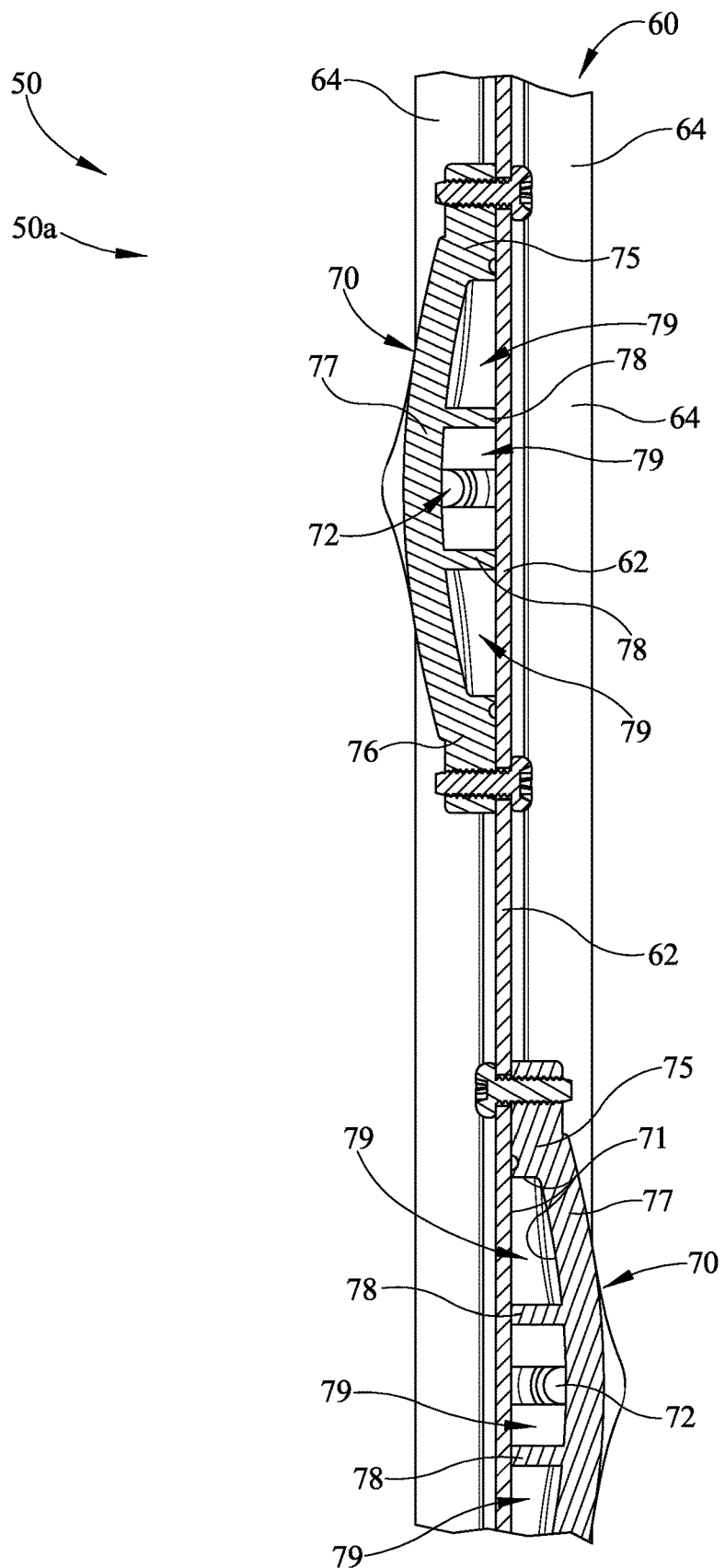

In the one embodiment shown, the depending arm 60 may include an elongated spine 62 mounted to the carriage block 54a and/or interior magnetic array 51a sliding in the transverse direction T along the rails 53a. The spine 62 may increase the strength of the depending arm and provide consistent alignment of the devices (e.g. probes, injectors, camera, sensors such as but is not limited to biological, temperature, velocity, etc., injector nozzles, etc.) attached thereto to scan or slide in the transverse direction T. The spine 62 may include one or more spine stiffeners 64. As shown more clearly in FIGS. 6 and 14, one implementation of the spine stiffener 64 is adjacent the downstream edge and extends along a portion of the length of the spine. The spine 62 may be made from a stainless steel in some embodiments.

The spine 62 may be a common wall for the one or more scan probes 70. The plurality of scan probes 70 may share the elongated spine wall. The spine 62 may define one or more walls, portions, or the inner periphery 71 of the one or more scan probes 70. In the one embodiment shown, adjacent scan probes 70 of the plurality of overlapping scan probes are positioned on opposing sides of the spine 62. The internal air passageway of the scan probe 70 may be defined by the inner periphery 71 of the scan probe 70 and/or spine 62 from the upstream inlet 74 towards the downstream outlet 72. The spine 62 may define a portion of the upstream inlet 74 and/or downstream outlet 72. For example, as shown in the one embodiment, the spine defines the upstream inlet and not the downstream outlet. As more clearly shown in FIGS. 7-11, a portion of the scan probe 70 may define three sides of the internal air passageway or inner periphery 71 with the top wall 75 and bottom wall 76 tapering towards the downstream outlet 72. The lateral side 77 of the three sided member may taper towards the inlet 74 and may be unparallel to the planar lateral face of the spine 62. This three sided member may be coupled to the planar lateral face of the elongated spine to form the inner periphery 71 of each adjacent scan probe 70.

In some implementations, the scan probes 70 may be constructed to increase accuracy or sample at an air flow velocity within the scan probe more closely to the duct velocity. One or more protrusions or dampers 78 within the internal air passageway or inner periphery of the probe 70 may equalize the velocity at the downstream outlet 72 of the scan probe 70 or fitting 61 to equalize the pressure entering the scan probe. The one or more protrusions 78 may define one or more channels 79 extending from the upstream inlet 74 towards the downstream outlet. The scan probes and spine, if used, to define the inner periphery may include the channels 79 and/or protrusions 78. The one or more channels 79 may decrease in size towards the downstream outlet 72. The channels 79 may be vertically positioned or stacked above adjacent channels within a vertical plane or the scan probe. The protrusions 78 may extend away from the inner periphery of the probe or lateral sides 77 thereof and project inwardly into the internal air passageway defined by the inner periphery 71. The one or more protrusions may extend from one or more sides of the inner periphery 71 of the scan probe 70 and/or spine 62.

In the one embodiment shown, the one or more protrusion may be one or more elongated fins or weir (e.g. continuous or intermittent) extending in the direction of air flow. The fin may extend from the upstream inlet 74 towards the downstream outlet 72 for a distance. In some embodiments, a distal end 78*a* of the fin may be spaced from the downstream outlet 72. The fin may be orientated transverse to the horizontal plane. In the one embodiment shown, a pair of elongated fins 78 taper towards each other in the direction of air flow towards the downstream outlet 72 thereby narrowing the channel 79 therebetween and the corresponding channels 79 between adjacent tapering top and bottom walls 75, 76 of the scan probe defining the inner periphery. The elongated ribs may extend across and between one or more lateral sides 77 of the scan probe. The lateral sides 77 of the probe between the top and bottom walls 75, 76 may expand from each other in the direction of air flow and correspondingly the elongated fins 78 may increase in width between the lateral sides 77 of the scan probe. If the spine is used, the elongated fin 78 may extend from the lateral side 77 of the three sided member to the substantially planar lateral surface of the elongated spine 62. The one or more protrusions 78 may extend inwardly from the spine and/or remaining portion of the scan probe. It should be understood the channels and protrusions shown in one embodiment in the Figures may be a variety of quantities, shapes, sizes, materials, orientations, and construction and still be within the scope of the invention.

As shown in the one implementation of the second scan assembly 30 positioned upstream of the filter area or filter 40, a variety of devices or structure may be attached to the interior portion or one or more carriage blocks traveling along the linear rails within the air passageway. The interior portion 50*a* of the track system 50 includes one or more injectors 90. The depending arm 60 or spine 62, if used, may include one or more injectors 90 extending along the spine (e.g. overlapping adjacent injectors by a length or distance D). The one or more injectors may slide between one or more lateral positions across the upstream face 42 of the filter in the transverse direction T. The injector(s) 90 may introduce aerosol, decontamination, or other material with increased accuracy and volume control to minimize the loaded of the filter when testing or introducing one or more materials towards the filter from the upstream position. For example, in some implementations the reduction of the amount of test aerosol used may benefit ePTFE filter applications. The test aerosol injected downstream from the scan assembly 30 or injectors 90 (e.g. aerosol injection nozzles) may create a uniform test aerosol profile discharged at the inlet to the filter. Typical systems utilized increased distance and turbulence generating structure (e.g. one or more baffles) to create uniformity at the filter, the scan assembly and/or injectors 90 may reduce the distance in front of the filter which may correspondingly allow a reduction in size (e.g. length) of the system 10.

It should be understood that the devices attached to the interior portion or depending arm(s) may be a variety of constructions, quantities, shapes, sizes, and positions within the housing and still be within the scope of the invention. For example, one or more visual devices or cameras (e.g. IR, thermal, etc.) may be attached to the interior portion 50*a* of one or more track systems 50. In various embodiments, one or more nozzles may be used. In addition in some embodiments, one or more sensors may be used for temperature, velocity, biological, etc. analysis. Moreover, for example, biological, decontamination, patching/repair (e.g. liquid), and/or fluorescent materials or the like may be introduced upstream and/or downstream of the filter (e.g. onto the surface of the filter) or at other locations within the air handling system. A thermal response, color spectrums, illumination of materials, and sterilization within the air handling system or filter may be desired to be controlled by the scan assembly.

A control system may be used to position the track system of one or more scan assemblies. The control system may control the rate of travel, one or more positions, direction of travel, monitoring, and/or introducing of materials of one or more scan assemblies. For example, the rate of travel and position of the first scan assembly and/or scan probes may be coordinated with the rate of travel and position of the first assembly introducing aerosol via the injectors. In some embodiments, the rate of travel of two or more scan assemblies may be different or the same.

Figure 18:
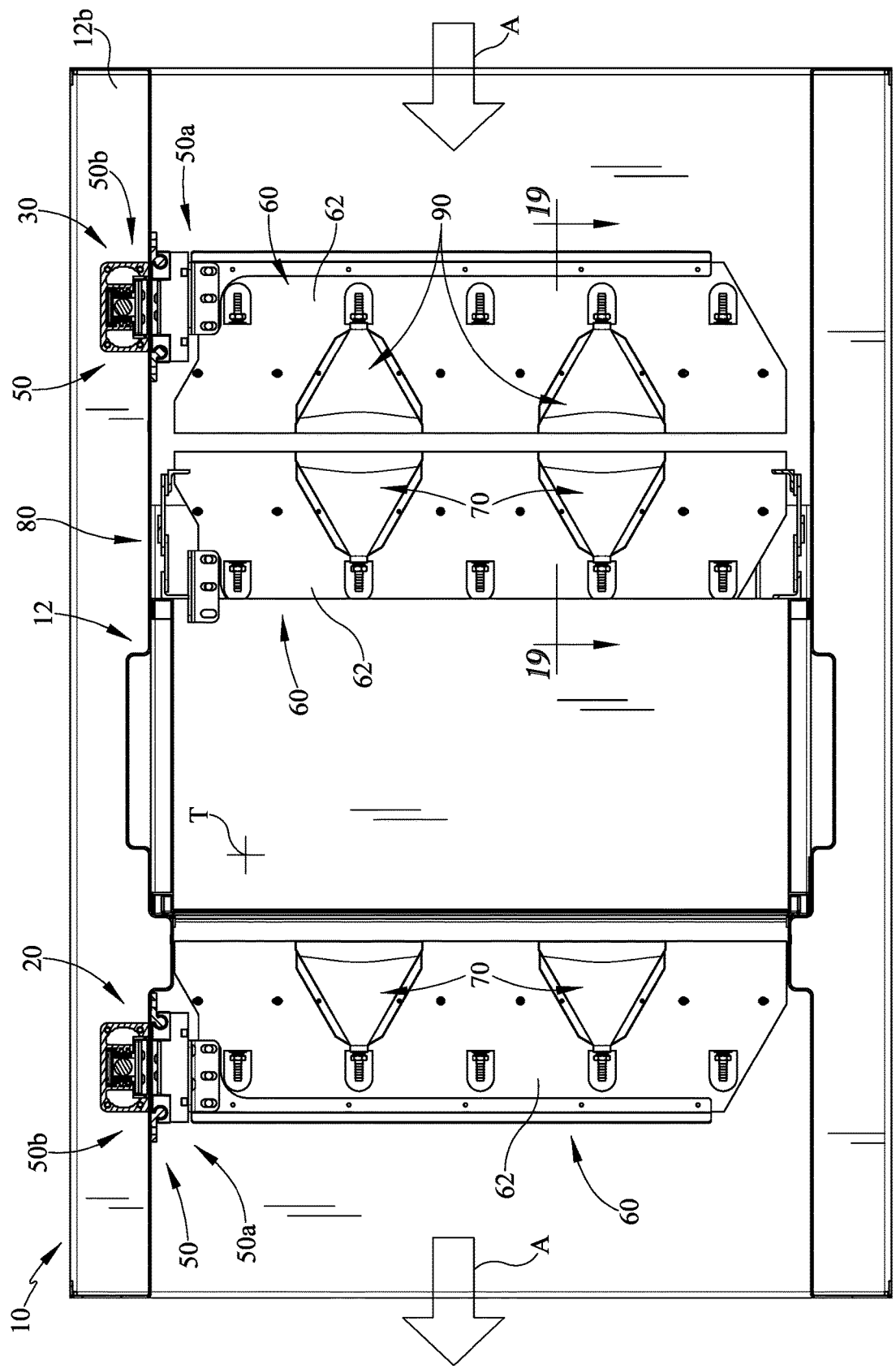
Figure 19:
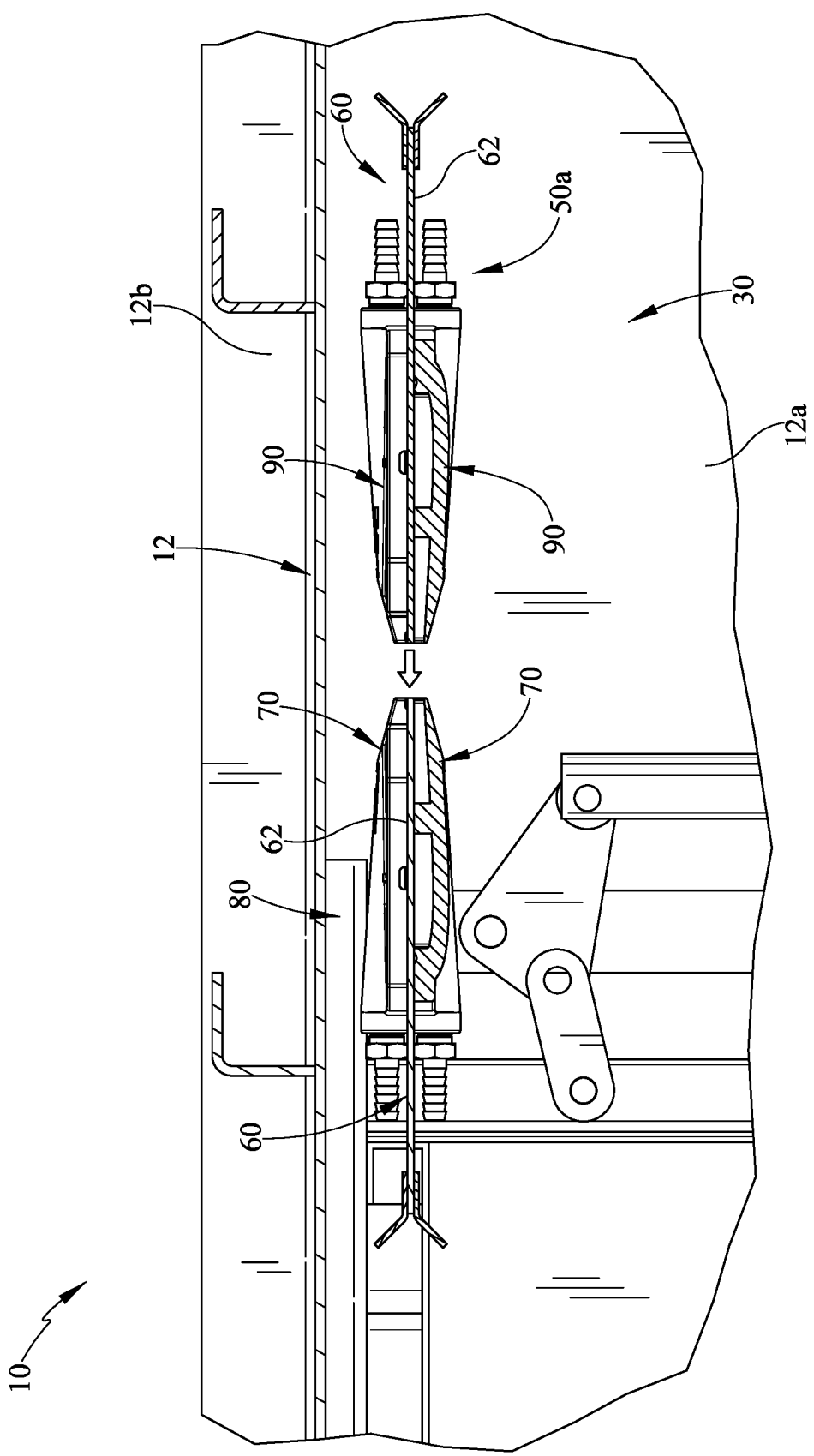

In some implementations, as shown in FIGS. 18 and 19, the air handling system 10 may include one or more probe assemblies 80 for validation and/or measurement of upstream aerosol challenge characteristics. The probe assembly 80 may be in a fixed position and laterally outside the outer periphery of the front face 42 of the filter 40. This fixed location may be a non-obtrusive location within the air passageway. A plurality of scan probes may be fixed in place to receive aerosol upstream of the one or more filters being tested and in alignment with the individual aerosol injection nozzles in their position (e.g. stationary parked). In the one embodiment shown, the probe assembly 80 may be a depending arm 60 with one or more scan probes 70. The probe assembly 80 may be directly coupled to the particle counter. The scan assembly 30 may be positioned (e.g. home position) in fluid communication with the downstream probe assembly 80. For example, one or more injectors 90 may be in fluid communication with one or more scan probes 70. The probe assembly 80 may be used for measurement and validation of the upstream aerosol challenging conditions emitted from the scan assembly 30. The probe assembly and validation/measurement may allow for particle counts that are more accurate and repeatable for a particular design condition of the application. The validation may be completed without entering or contaminating the sealed air passageway 11. It should be understood that other materials or characteristics of air flow or conditions within the housing (e.g. decontamination agents, thermal, velocity, etc.) may be validated or measured with the probe assembly. The probe assembly and probes/sensors may be a variety of materials, quantities, positions, shapes, sizes, and constructions and still be within the scope of the invention.

Conducting the upstream count verification of the probe assembly may involve connecting one of the stationary corresponding receptor probes to the particle counter and initiating the flow of test aerosol through the corresponding aerosol injection nozzle for an appropriate period of time and/or cycles. Once completed, the system may be manually or automatically cycled to the next corresponding set of receptor probes and aerosol injecting nozzles and the calculation repeated. Once all the probe/nozzle assemblies have been tested, the average of the statistically valid values is determined and set as the Cu or upstream count.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An apparatus for introducing features to or monitoring characteristics of an air filter within an air handling system, comprising:

a depending arm moveable in linear direction transverse to an air flow within an air handling system;

wherein the depending arm includes an elongated spine extending for a length in a vertical direction;

a plurality of scan probes is positioned along the length of the elongated spine, each one of the plurality of scan probes having an inner periphery defining an internal air passageway, wherein a portion of the inner periphery of each scan probe is defined by a portion of the elongated spine;

wherein each one of the plurality of scan probes includes one or more channels extending from an upstream inlet towards a downstream outlet of the scan probe; and wherein the one or more channels are defined by one or more protrusions extending from the inner periphery of the scan probe.

2. The apparatus of claim 1 wherein the one or more channels decrease in size towards the downstream outlet.

3. The apparatus of claim 1 wherein the one or more channels are positioned in a vertical position relative to each other.

4. The apparatus of claim 1 wherein the elongated spine defines a portion of the upstream inlet and does not define the downstream outlet.

5. The apparatus of claim 1 wherein each one of the plurality of scan probes includes a three sided member tapering towards a downstream outlet coupled to a substantially planar lateral face of the elongated spine.

6. The apparatus of claim 1 wherein adjacent scan probes of the plurality of scan probes overlap for a distance along the length of the elongated spine.

7. The apparatus of claim 6 wherein the adjacent scan probes are positioned on opposing sides of the elongated spine.

8. The apparatus of claim 1 wherein the one or more protrusions are an elongated fin extending in the direction of the air flow.

9. The apparatus of claim 8 wherein the elongated fin extends from the upstream inlet to a distance spaced away from the downstream outlet.

10. The apparatus of claim 8 wherein the elongated fin is transverse to a horizontal plane.

11. The apparatus of claim 8 wherein a pair of the elongated fins taper towards each other in the direction of air flow towards the downstream outlet.

12. An apparatus for introducing features to or monitoring characteristics of an air filter within an air handling system, comprising:

a depending arm moveable in linear direction transverse to an air flow within an air handling system;

wherein the depending arm includes an elongated spine extending for a length in a vertical direction;

a plurality of scan probes is positioned along the length of the elongated spine, each one of the plurality of scan probes having an inner periphery defining an internal air passageway, wherein a portion of the inner periphery of each scan probe is defined by a portion of the elongated spine;

wherein adjacent scan probes of the plurality of scan probes overlap for a distance along the length of the elongated spine; and wherein the adjacent scan probes are positioned on opposing sides of the elongated spine.

13. The apparatus of claim 12 wherein each one of the plurality of scan probes includes a three sided member tapering towards a downstream outlet coupled to a substantially planar lateral face of the elongated spine.

14. The apparatus of claim 12 wherein each one of the plurality of scan probes includes one or more channels extending from an upstream inlet towards a downstream outlet of the scan probe.

15. The apparatus of claim 14 wherein the one or more channels decrease in size towards the downstream outlet.

16. The apparatus of claim 14 wherein the one or more channels are positioned in a vertical position relative to each other.

17. The apparatus of claim 14 wherein the elongated spine defines a portion of the upstream inlet and does not define the downstream outlet.

18. An apparatus for introducing features to or monitoring characteristics of an air filter within an air handling system, comprising:
   a depending arm moveable in linear direction transverse to an air flow within an air handling system;
   wherein the depending arm includes an elongated spine extending for a length in a vertical direction;
   a plurality of scan probes is positioned along the length of the elongated spine, each one of the plurality of scan probes having an inner periphery defining an internal air passageway, wherein a portion of the inner periphery of each scan probe is defined by a portion of the elongated spine; and
   wherein each one of the plurality of scan probes includes a three sided member tapering towards a downstream outlet coupled to a substantially planar lateral face of the elongated spine.

19. An apparatus for introducing features to or monitoring characteristics of an air filter within an air handling system, comprising:
   a depending arm moveable in linear direction transverse to an air flow within an air handling system;
   wherein the depending arm includes an elongated spine extending for a length in a vertical direction;
   a plurality of scan probes is positioned along the length of the elongated spine, each one of the plurality of scan probes having an inner periphery defining an internal air passageway, wherein a portion of the inner periphery of each scan probe is defined by a portion of the elongated spine;
   wherein each one of the plurality of scan probes includes one or more channels extending from an upstream inlet towards a downstream outlet of the scan probe; and
   wherein the one or more channels are positioned in a vertical position relative to each other.

* * * * *